(12) United States Patent
Borsina et al.

(10) Patent No.: US 7,263,033 B2
(45) Date of Patent: Aug. 28, 2007

(54) METHOD AND DEVICE FOR AFFECTING THE BEHAVIOR OF LOBSTERS

(75) Inventors: Lawrence Borsina, Frisco, CO (US); John Kosbab, Breckenridge, CO (US); Charles Shaffer, Islamorada, FL (US)

(73) Assignee: Moonsky Assets, Inc., Charlestown, Nevis (KN)

( * ) Notice: Subject to any disclaimer, the term of this patent is extended or adjusted under 35 U.S.C. 154(b) by 261 days.

(21) Appl. No.: 10/755,076

(22) Filed: Jan. 8, 2004

(65) Prior Publication Data
US 2005/0232083 A1    Oct. 20, 2005

Related U.S. Application Data

(60) Provisional application No. 60/438,890, filed on Jan. 8, 2003.

(51) Int. Cl.
H04B 1/02 (2006.01)

(52) U.S. Cl. .................................... 367/139

(58) Field of Classification Search ............... 367/139; 119/719; 43/100; 700/94
See application file for complete search history.

(56) References Cited

U.S. PATENT DOCUMENTS

| | | |
|---|---|---|
| 3,414,873 A | 12/1968 | Richard et al. |
| 3,494,064 A | 2/1970 | Stein |
| 3,508,358 A | 4/1970 | Lee |
| 3,638,346 A | 2/1972 | Stein |
| 3,680,245 A | 8/1972 | Brooks |
| 4,417,301 A | 11/1983 | Newman |
| 4,646,276 A | 2/1987 | Kowalewski et al. |
| 4,922,468 A | 5/1990 | Menezes |
| 4,932,007 A | 6/1990 | Sumomala |
| 4,951,410 A | 8/1990 | Ly |
| 4,955,005 A | 9/1990 | Loeffelman |
| 5,046,278 A | 9/1991 | Szilagyi et al. |
| 5,133,959 A | 7/1992 | Kumins |
| 5,148,622 A | 9/1992 | Blair |
| 5,177,891 A | 1/1993 | Holt |
| 5,282,178 A | 1/1994 | Hill et al. |
| 5,291,682 A | 3/1994 | Zaccheo |
| 5,331,760 A | 7/1994 | DuMont |
| 5,343,442 A | 8/1994 | Vielberth |
| 5,349,774 A | 9/1994 | Parra |

(Continued)

FOREIGN PATENT DOCUMENTS

CA    2325291    *   5/2002

OTHER PUBLICATIONS

Michael Stocker; Fish, Mollusks and other Sea Animals use of Sound, and the Impact of Anthropogenic Noise in the Marine Acoustic Environment; Mar. 2001; www.msa-design.com/FishEars.html#_edn47; pp. 11-12.*

(Continued)

*Primary Examiner*—Dan Pihulic
(74) *Attorney, Agent, or Firm*—Greenlee, Winner and Sullivan, P.C.

(57) ABSTRACT

A method and device for affecting the behavior of lobsters is provided. The method comprises playing recorded lobster acoustic signals that affect the behavior of lobsters underwater. A device for playing the recorded acoustic signals is also provided.

15 Claims, 47 Drawing Sheets
(9 of 47 Drawing Sheet(s) Filed in Color)

U.S. PATENT DOCUMENTS

| | | | |
|---|---|---|---|
| 5,415,862 | A | 5/1995 | Bethshears et al. |
| 5,474,030 | A | 12/1995 | Pittet et al. |
| 5,575,240 | A | 11/1996 | Udelle et al. |
| 5,579,723 | A | 12/1996 | Pittet et al. |
| 5,651,209 | A | 7/1997 | Rainey |
| 5,823,141 | A | 10/1998 | Pittet et al. |
| 5,836,264 | A | 11/1998 | Pittet et al. |
| 5,883,858 | A | 3/1999 | Holt |
| 6,047,492 | A | 4/2000 | Watson et al. |
| 6,170,436 | B1 | 1/2001 | Goodson et al. |
| 6,389,735 | B1 | 5/2002 | Holt |

OTHER PUBLICATIONS

Childress, M. J. et al., "The ontogeny of social behavior among juvenile Caribbean spiny lobsters," Anim. Behav. 51:675-687, 1996.

Connaughton, M. A. et al., "Effects of fish size and temperature on weakfish disturbance calls: implications for the mechanism of sound generation," J Exp Biol 203:1503-1512, 2000.

Doing the lobster rock [online], May 9, 2001 [retrieved Jun. 20, 2002]. Retrieved from the internet: < URL: http://news.bbc.com.uk/hi/english/sci/tech/newsid 1321000/1321148.stm>.

Gausland, I., "Physics of Sound in Water," Proceedings of the Seismic and Marine Mammals Workshop, Tucker & Weir (eds.), London, Jun. 23-25, 1998.

Greene, S., Musical Lobsters: The fiddler of the sea turns out to be a different crustacean than expected [online], Jul. 17, 2001 [retrieved on Jun. 12, 2002]. Retrieved from the internet: < URL: http://www.discover.com/aug_01/featlobster.html>.

Harris, M., "Lobsters play biological violins," Journal of Young Investigators 4(1):1-3, 2001.

International Search Report for International Application No. PCT/US04/00504, dated Apr. 29, 2005, 5 pages.

Lipsher, S., 'E-bait' may be catch of the day, Denver Post [online], Feb. 24, 2003 [retrieved on Oct. 21, 2005]. Retrieved from the internet: < URL: http://nl.newsbank.com/nl-search/we/Archives?p_action=doc&p_docid=0F96F05035400>.

Patek, S., "Spiney lobsters stick and slip to make sound," Nature 411:153-154, 2001.

Shrimp, bubble and pop [online], Sep. 21, 2000 [retrieved on Jun. 20, 2002]. Retrieved from the internet: < URL: http://news.bbc.com.uk/hi/english/sci/tech/newsid 935000/935855.stm>.

Spiny lobster violinists [online], May 15, 2001 [retrieved on Jun. 12, 2002]. Retrieved from the internet: < URL: http://www.bbc.co.uk/worldservice.sci_tech/highlights/010515_lobster.shtml>.

Stocker, M., "Fish mollusks and other sea animals, and the impact of anthropogenic noise in the marine acoustical environment," Michael Stocker Associates for Earth Island Institute, pp. 1-30, Mar. 2002.

Stocker, M., Fish mollusks and other sea animals' use of sound, and the impact of anthropogenic noise in the marine acoustic environment [online], Mar. 2, 2001 [retrieved on Oct. 21, 2005]. Retrieved from the internet: < URL: http//www.msa-design.com/FishEars.html>.

The Caribbean Spiny Lobster [online], [retrieved on Jun. 12, 2002]. Retrieved from the internet: <URL: http://www.cayman-nationaltrust.org/caribbean_spiny_lobster.htm>.

Transcript of Lobster Bait Inventor, Colorado Public Radio, Mar. 13, 2003.

* cited by examiner

METHOD AND DEVICE FOR AFFECTING THE BEHAVIOR OF LOBSTERS

CROSS-REFERENCE TO RELATED APPLICATIONS

This application takes priority from U.S. provisional application No. 60/438,890, filed Jan. 8, 2003, which is hereby incorporated by reference to the extent not inconsistent with the disclosure herewith.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyrights whatsoever.

BACKGROUND OF THE INVENTION

This invention relates to a method and device for affecting the behavior of lobsters.

Lobster fishing is an important industry. In the United States, the total landed catch of spiny lobsters averages 9 million pounds per year. The import of spiny lobsters averages 87 million pounds per year. Fishermen have attempted to use scents (cowhide soaked in diesel fuel or motor oil on the trap, for example) to attract lobsters. However, these scent attractors are environmentally unfriendly and only attract lobsters located downstream of the scent source.

It is known that the behavior of many fish and marine mammals is affected by sounds in the aquatic environment. For example, dolphins are believed to be repelled by killer whale sounds. Fish are believed to be attracted to sounds of other fish striking and eating bait fish. These behavioral effects can be used by fishermen to affect the behavior of fish or marine mammals. For example, U.S. Pat. Nos. 5,349,774 and 5,291,682 suggest playing killer whale sounds near tuna nets causes dolphins to leave the area and results in fewer dolphins being caught in nets. U.S. Pat. No. 5,282,178 suggests that playing the sound of a bass fish striking and eating a bait fish attracts other bass fish. Fishing lures for game fish have been described that play sounds that are believed to attract fish (U.S. Pat. No. 5,177,891).

While it is known that fish and dolphins make and respond to sounds, it was not known that lobsters make sounds until very recently, and the purpose of these sounds is under debate. It has been suggested that the rasps lobsters make when attacked by predators were defensive in order to deter the predator (Patek, S. "Spiny lobsters stick and slip to make sound" Nature (2001) 153). The lobster used in the research described above were captured in the Florida Keys and provided to Patek by Charles F. Shaffer/Keys Marine Research Institute/John Swanson. However, lobster sounds have also been reported to be agitative to lobsters when played back (Stocker, M. "Fish, Mollusks and other Sea Animals, and the Impact of Anthropogenic Noise in the Marine Acoustical Environment" Michael Stocker Associates for Earth Island Institute (March 2002) 1-30).

There is a need in the art for a method of affecting the behavior of lobsters and other marine animals using sound, and also for providing a method of creating positive taxis of lobsters and other marine animals (reflex movement to a source of stimulation).

Deposits of the acoustic signals were made with the United States Copyright Office on Feb. 13, 2003 and are incorporated by reference.

SUMMARY OF THE INVENTION

Prior to this invention, there was no known method or device capable of affecting the behavior of lobsters using sound. Provided herein are methods and devices for affecting the behavior of lobsters. More particularly, provided is a method of affecting the behavior of lobsters, comprising playing a recorded acoustic signal of a lobster underwater, which acoustic signal affects the behavior of lobsters. In one embodiment, an acoustic signal known to have an attractant effect to lobsters is incorporated in a device attached to a lobster trap. The device is described further herein. In another embodiment, an acoustic signal known to have another behavioral effect on lobsters is incorporated in a device that is placed on or near a position where it is desired to induce the behavioral effect. In another embodiment, the device is placed near or in lobster habituates, such as metal drums, wood shelters, caves, or any other locations where lobsters live or travel through. Methods of determining the acoustic signals that alter the behavior of lobsters are also provided herein. Acoustic signals that elicit a desired behavior of lobsters are also provided herein.

This invention is also directed to a method affecting the behavior of marine animals using an electronic device. The invention is useful to attract various species of lobster, crabs and other marine animals.

As used herein, "affecting the behavior" of an animal means attracting the animal, repelling the animal, exciting the animal, causing the animal to exhibit anti-social behavior (being solitary), causing the animal to exhibit social behavior, causing the animal to dig or nest, exhibit a positive taxis, causing the animal to warn other animals or any other observable behavior. The particular acoustic signal that is played will determine the behavior that is affected. In one embodiment, playing an acoustic signal will trigger the behavior.

As used herein, "marine animal" includes fish, marine mammals, crustaceans, and any other animal which lives in water. The preferred marine animal is a lobster. One example is the spiny lobster.

As used herein, "acoustic signal" or "sound" is used to designate a collection of frequencies that form an auditory stimulus.

Signal A19 and A18 are both used to designate the same signal herein.

As used herein, "electronic device" or "device" includes a case, a sound, a power source, and a means of playing the sound. Other components may be present, as required or desired, as known in the art.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The invention is described further in the following non-limiting description and examples. In the Figures, like numbers indicate like features unless specifically indicated otherwise.

We have discovered that lobsters show a change in behavior in response to acoustic signals. We have also discovered that lobsters can be attracted by playing attractive acoustic signals. Prior to this invention there was no suggestion that lobsters would be attracted in response to acoustic signal.

The previous methods of collecting sounds of lobster have been in a controlled environment (i.e.: a tank at a research facility). This controlled environment, although advantageous to the researcher, created an agitated state to the lobster; therefore, the sounds recorded were primarily distress calls. The present experiments were started in the same traditional method (i.e.: recording in a 750 gal. tank) and when the first sounds that were thought to be communication were played back in a 2,000 gal. tank in which lobster have lived for several years and not been molested, it was discovered the recorded sound was a distress signal which fit the pattern of the previous research. At this juncture the research was moved to open waters with a bait bag tied to the hydrophone to record the lobster in a natural environment during a time when they were not under duress.

Acoustic signals of lobsters were recorded, edited in order to isolate specific sounds and frequencies and played back underwater. From these experiments, the effect of the acoustic signal on the behavior (if any) of the lobster was determined. The acoustic signals that affect lobster behavior are incorporated into devices to affect the behavior of lobsters, or the acoustic signals are otherwise generated to affect the behavior of lobsters (for example, playing into the water using an underwater speaker suspended from a base station on a boat).

As used herein, "train" is used to designate single sounds made by lobsters, separated from other lobster sounds, or groups of lobster sounds.

The acoustic signals are played back preferably at approximately the same intervals at which the lobster made the sounds. In most cases, trains are played back once every 60 to 90 seconds. Other repetition rates are also useful, as can be determined using the methods described herein.

Figure 1:
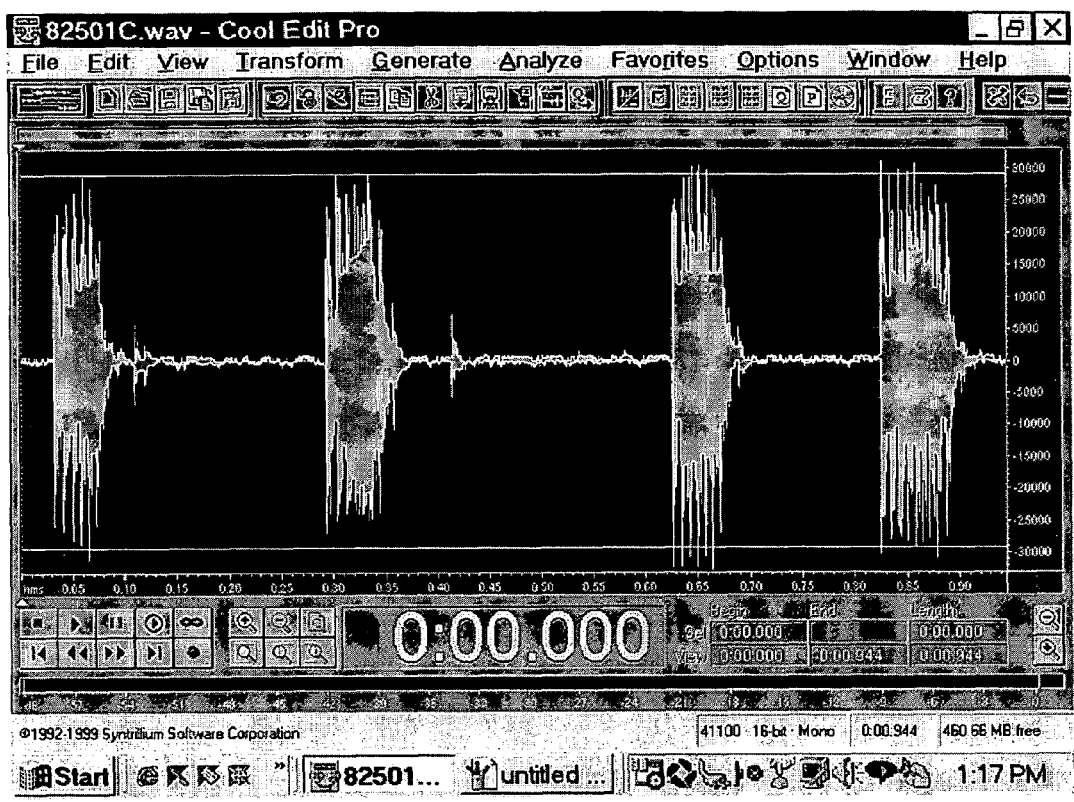
FIG. 1 shows the waveform of a recorded lobster acoustic signal that attracts lobsters. This waveform is designated "82501c" in all materials submitted herein and herewith.

FIG. 1 shows the waveform of an acoustic signal of a lobster that attracts lobsters. The acoustic signal shown in FIG. 1 shows 4 trains. The repetition rate is preferably 0.944 Hz.

Figure 2:
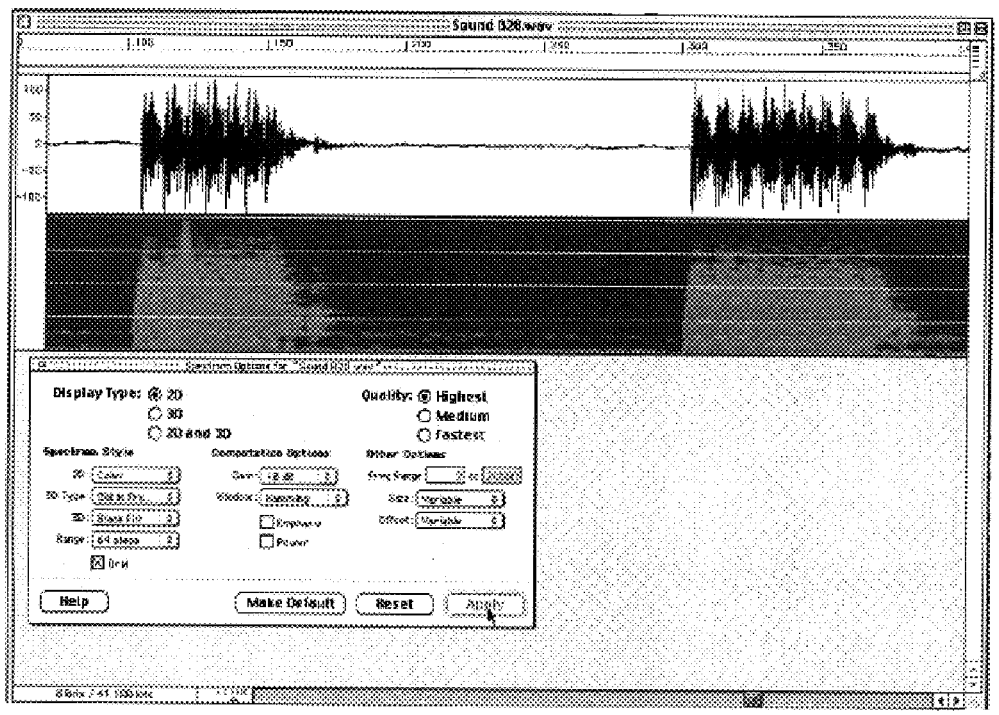
FIG. 2 shows the waveform of a recorded lobster acoustic signal that agitates lobsters. This waveform is designated "B28" in all materials submitted herein and herewith.

FIG. 2 shows the waveform of an acoustic signal of a lobster that agitates lobsters. This acoustic signal shown in FIG. 2 shows 2 trains.

This invention may be used to affect the behavior of any marine animals. The preferred marine animal is a crustacean, particularly a lobster. This invention may also be used to affect the behavior of fish and marine mammals, by recording acoustic signals of the animal of interest, playing back the acoustic signal underwater, monitoring the behavior of the animal, and selecting those acoustic signals that affect the behavior in the desired way. The selected acoustic signals can be used in a device, such as those described herein.

The signal may be incorporated into any device capable of playing the acoustic signal back. This device may be used in any suitable manner known to one of ordinary skill in the art, and is preferably attached to a lobster trap. The device sends out acoustic signals 360 degrees from the signal source and can therefore attract lobsters both upstream and downstream from the signal source. More than one acoustic signal can be placed in the device, and depending on the desired behavior to be affected, the desired acoustic signal can be played at a desired time. For example, a device can be made that contains recorded acoustic signals that attract and repel the animal. If the animal is desired to be repelled from a certain area, the repel acoustic signal is played. If the animal is desired to be attracted to a certain area, the attractive acoustic signal is played. Control of the acoustic signal that is played is provided by any of a number of means known in the art, such as remote monitoring or motion- or pressure-sensitive devices.

Materials/Case

Figure 3:
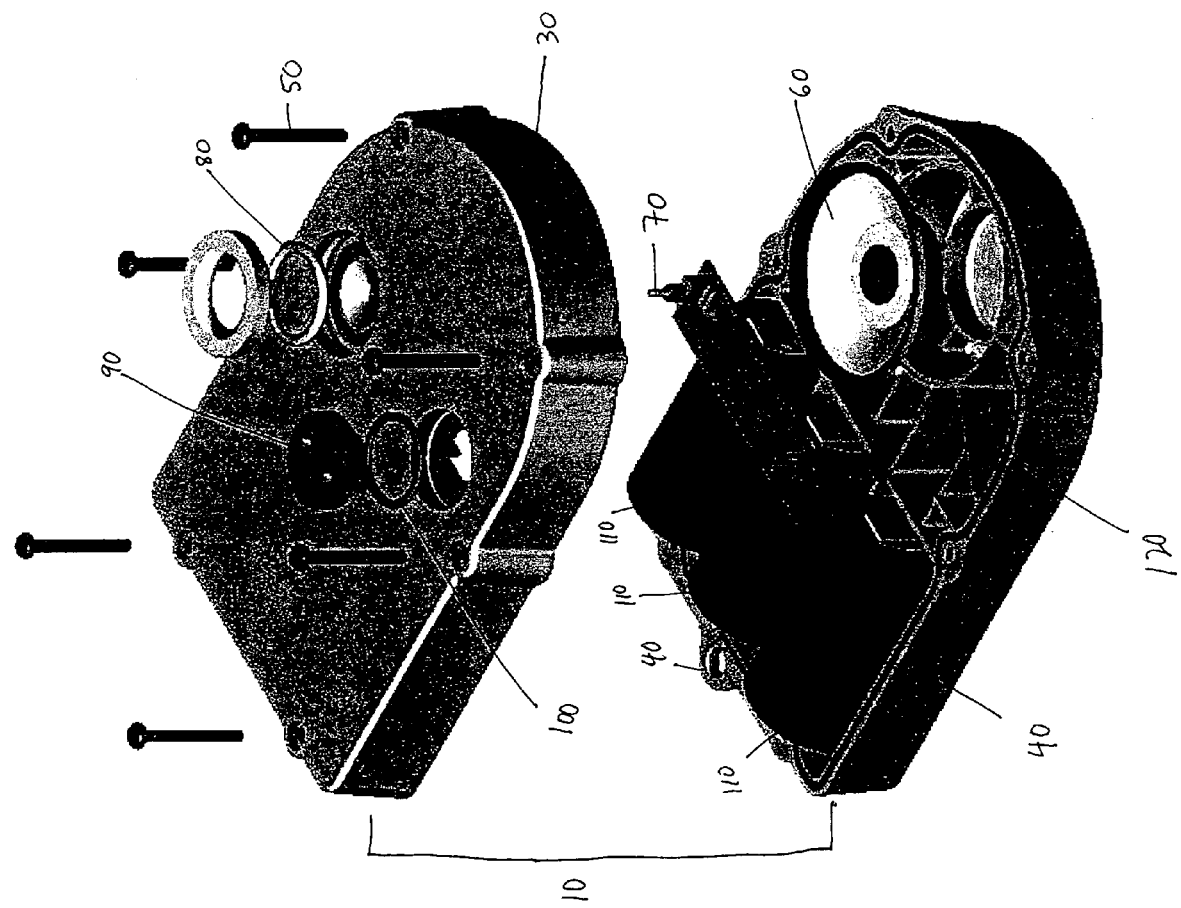
FIG. 3 shows one embodiment of the lobster caller.

One embodiment of the device is shown in FIG. 3. In FIG. 3, a top (30) and bottom (40) portion made from water resistant materials form water-resistant housing 10 and are mated together and attached with screws (50) and one or more o-rings or other water-tight seals (120) as known in the art. O-Rings are made from neoprene, or other suitable material, as known in the art. Alternatively, waterproof sealants such as silicone may be used to make the device waterproof. Alternative attachment means may be used, as known in the art. Speaker (60) is shown. Any speaker capable of playing back the desired frequencies at the desired volume level may be used, as known in the art. On-off switch (70) is also shown with appropriate o-rings or other water-tight seals (80). Recharging receptacle (90) is shown with appropriate o-rings or other water-tight seals (100). Any type of recharging component or circuit may be used, as known in the art. Batteries (110) are also shown.

Figure 4:
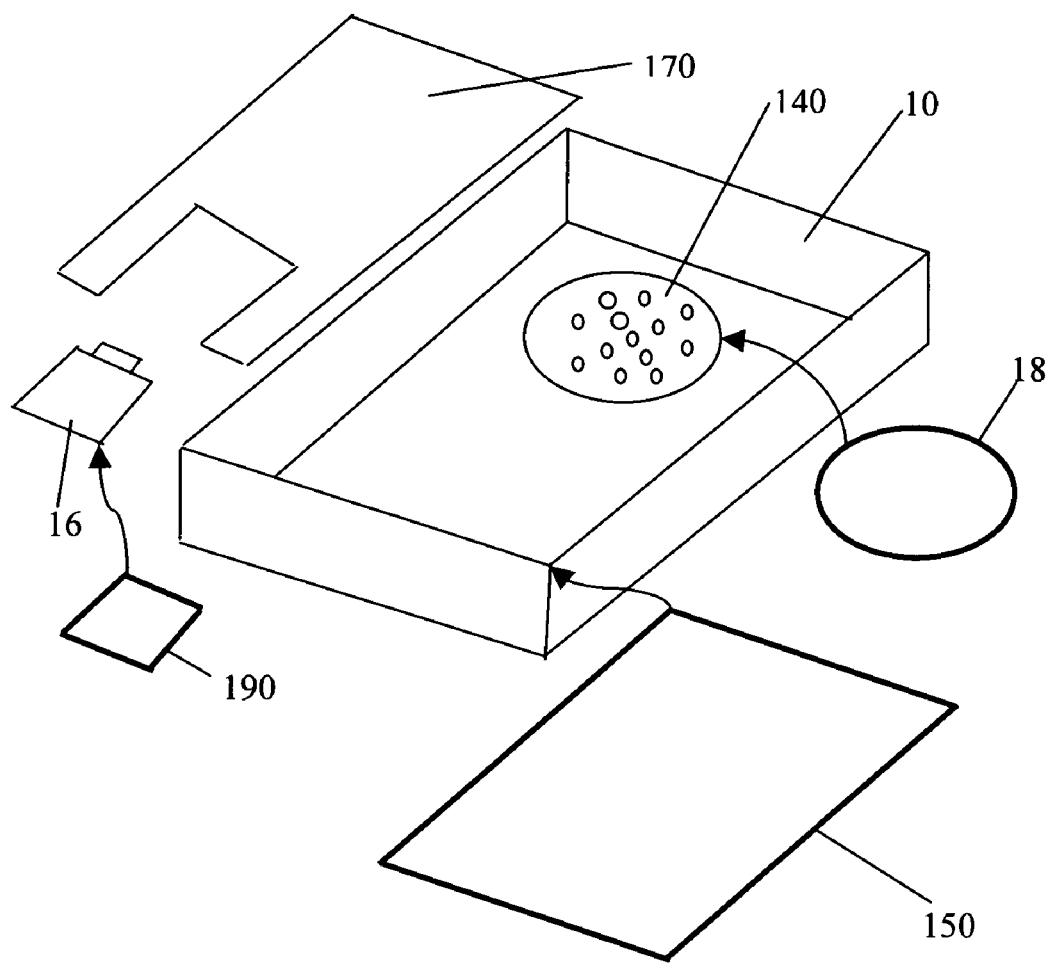
FIG. 4 shows the waterproof seals used in one embodiment of the device.

Water-resistant housing 10 can be fabricated in two parts, for example a front and a back, and then attached together with any suitable means, such as screws, or any other suitable fabrication plan may be used, as known in the art. If the device is fabricated with more than one part, an O-ring or other suitable object is used to prevent water leakage into the device, as known in the art and shown in FIG. 4 (18, 150, 190). FIG. 4 shows speaker 140 with O-ring 18 surrounding. In FIG. 3, recharging receptacle 90 is shown that allows recharging the device without opening the water-resistant housing 10. A preferred power source is one or more alkaline batteries. Disposable batteries can also be used, and changed by opening housing 10 by removing or sliding open cover 16 mated to back 170 in FIG. 4. Any suitable power source may be used, as known in the art. In FIG. 3, on-off switch 70 is also shown. When switch 70 is on, the speaker plays the acoustic signal(s) recorded in the device. A soundboard is described herein, where the digital form of the sound is present. However, other means of playing back the sounds are useful and known in the art, such as tapes. FIG. 3 also shows attachment means 40 which allows attaching the device to the desired object, including a lobster trap, a fishing net, or a fishing lure, for example. The device may also be attached to objects that animals are desired to be repelled from, for example openings for water intakes.

Figure 5:
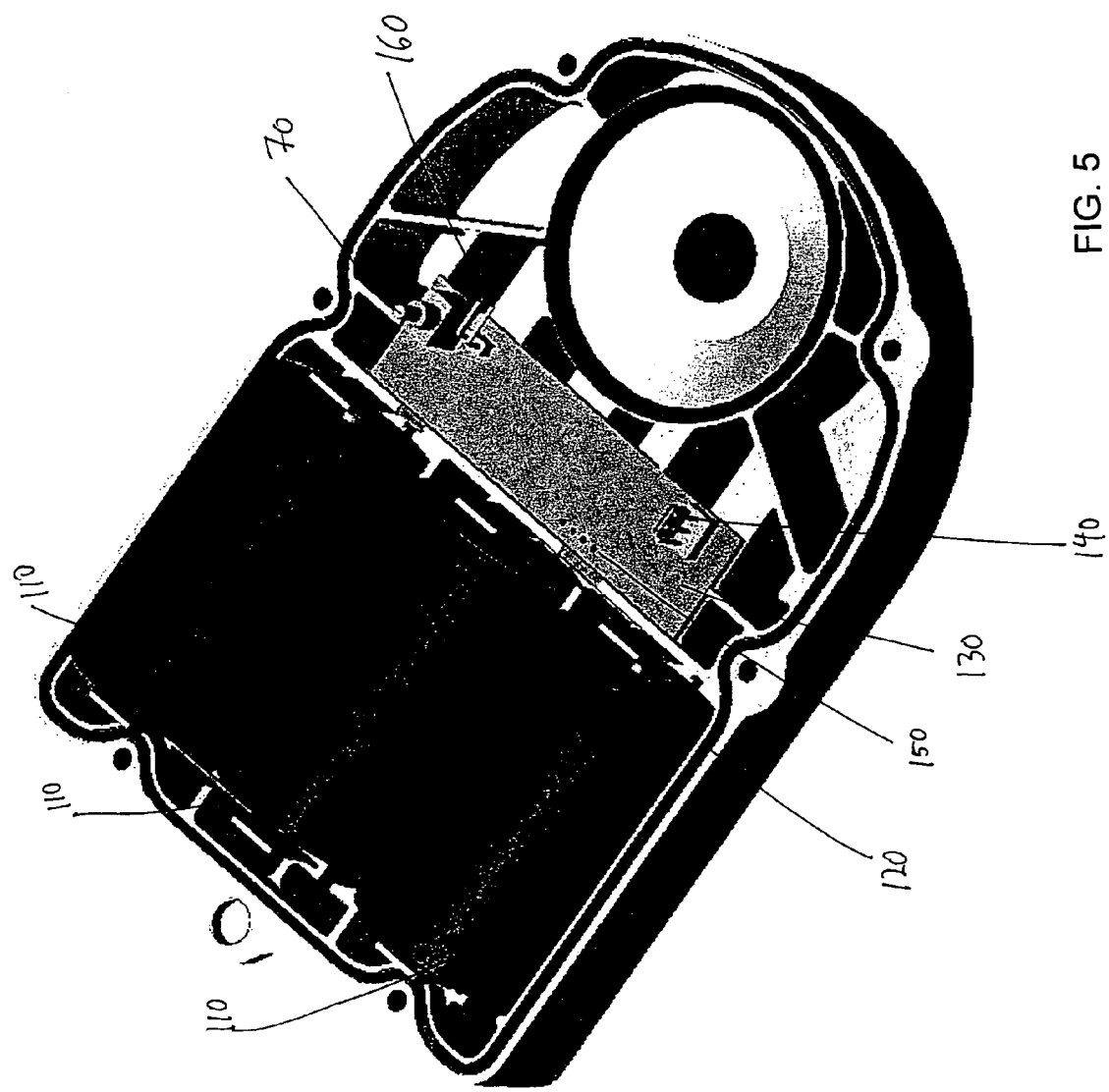
FIG. 5 shows one view of the bottom of the electronic device.
Figure 6:
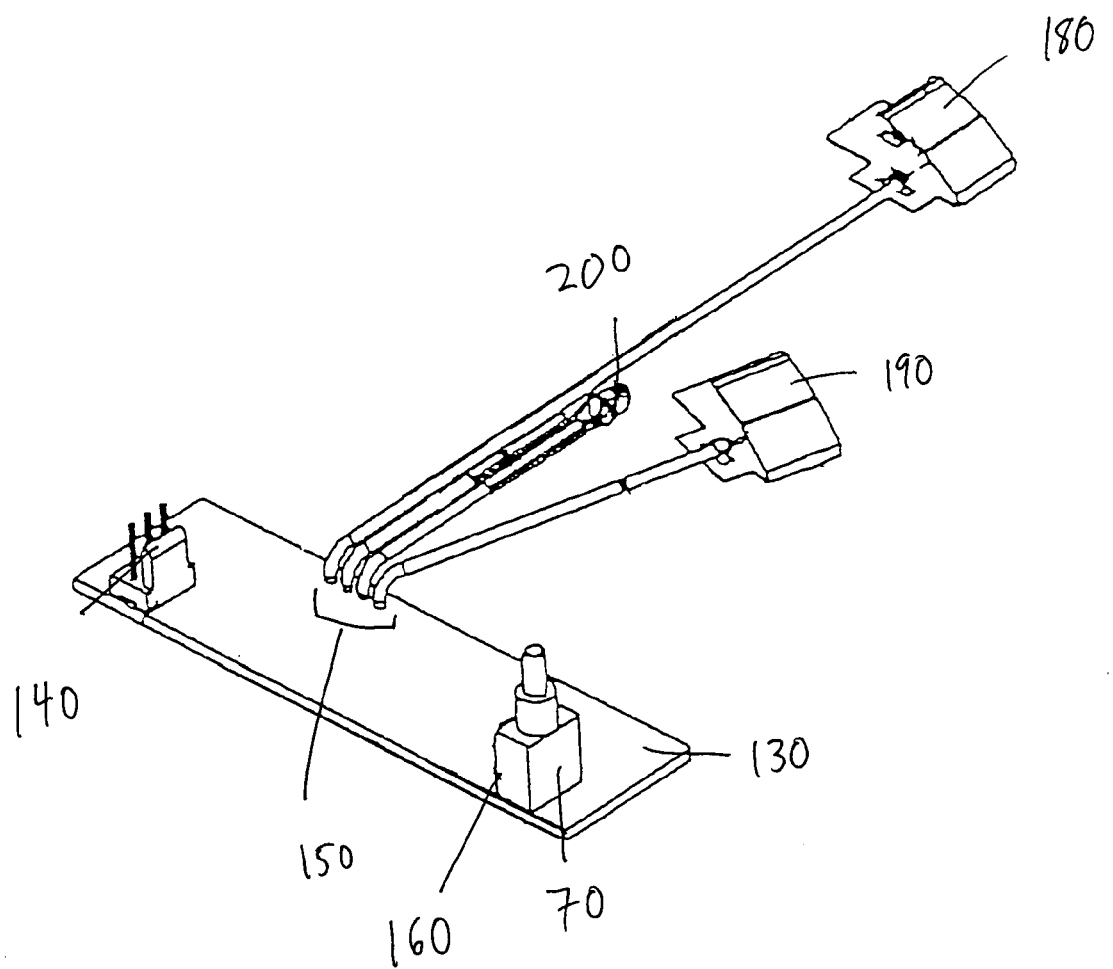
FIG. 6 shows one embodiment of the circuit board.

FIG. 5 shows a close-up view of the bottom portion (40) of the case. FIG. 5 shows batteries (110), o-ring (120), circuit board (130) having on-off switch (70) and recharging attachment (140). Circuit board (130) is attached to battery connectors through battery connector attachment (150). Circuit board (130) also contains speaker attachment (160). Battery connector attachment (150) is shown in more detail in FIG. 6. FIG. 6 shows a detailed view of circuit board (130). Circuit board shows on-off switch (70) and speaker attachment (160). Circuit board (130) shows recharging attachment (140) and battery connector attachment (150). Battery connector attachment (150) includes battery connectors (190) and (180) and thermister (200).

Figure 7:
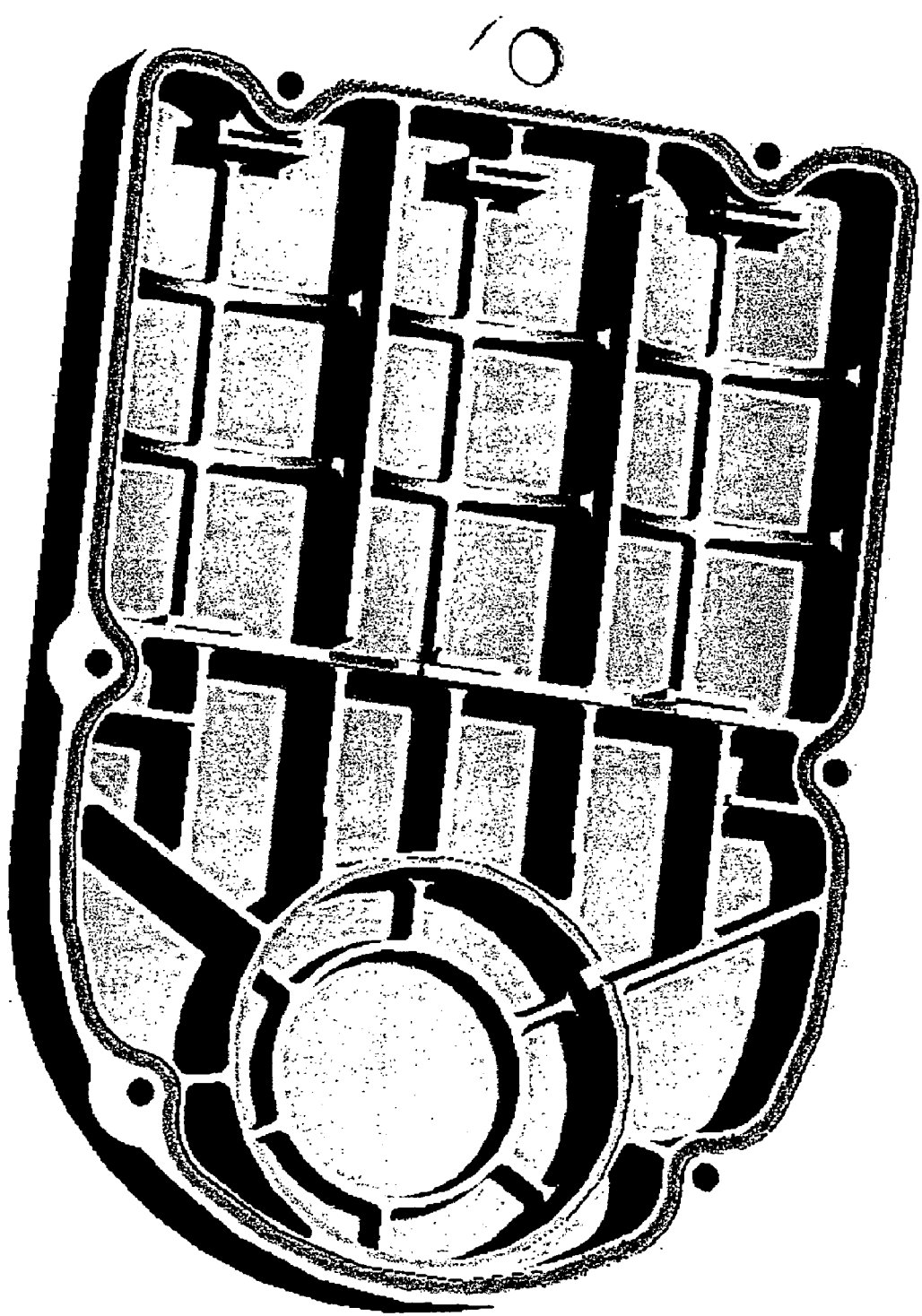
FIG. 7 shows one view of the bottom of the case.
Figure 8:
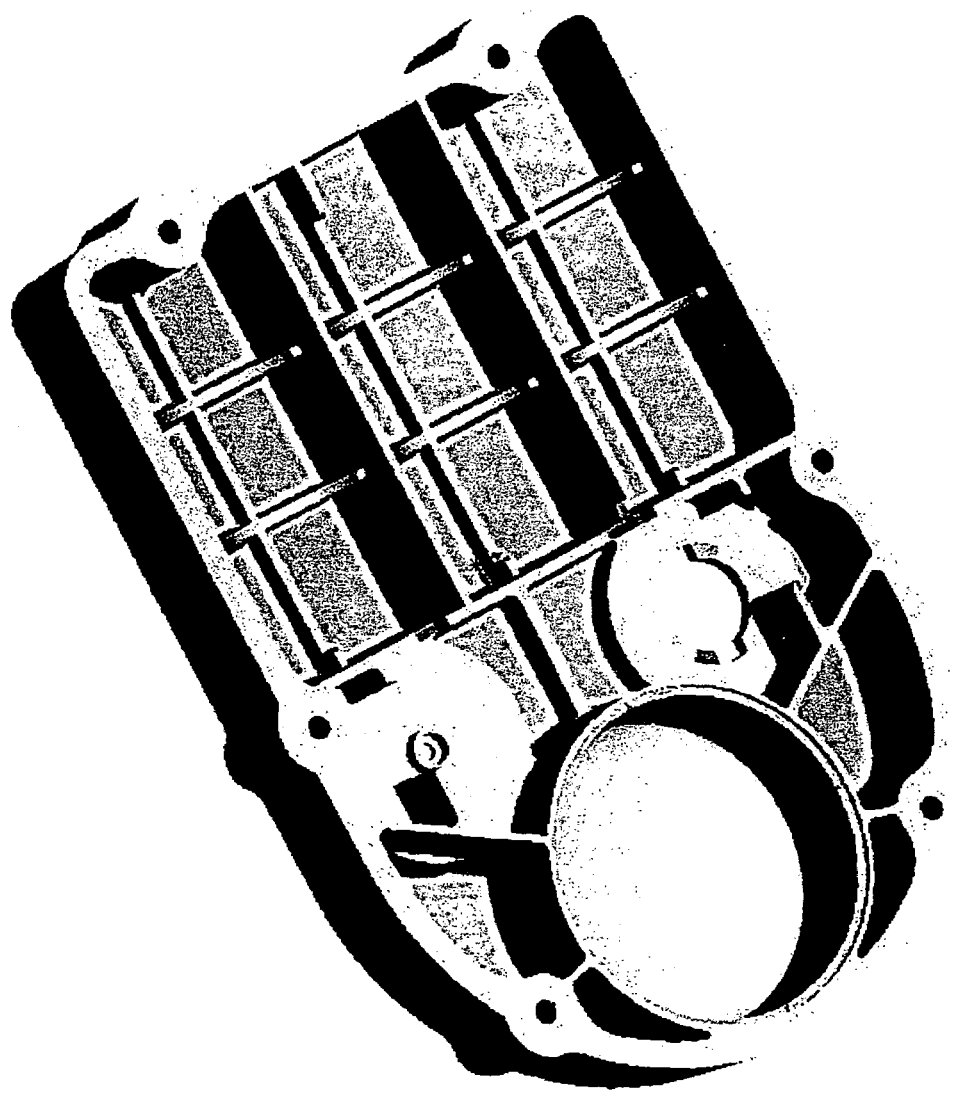
FIG. 8 shows one view of the top of the case.
Figure 9:
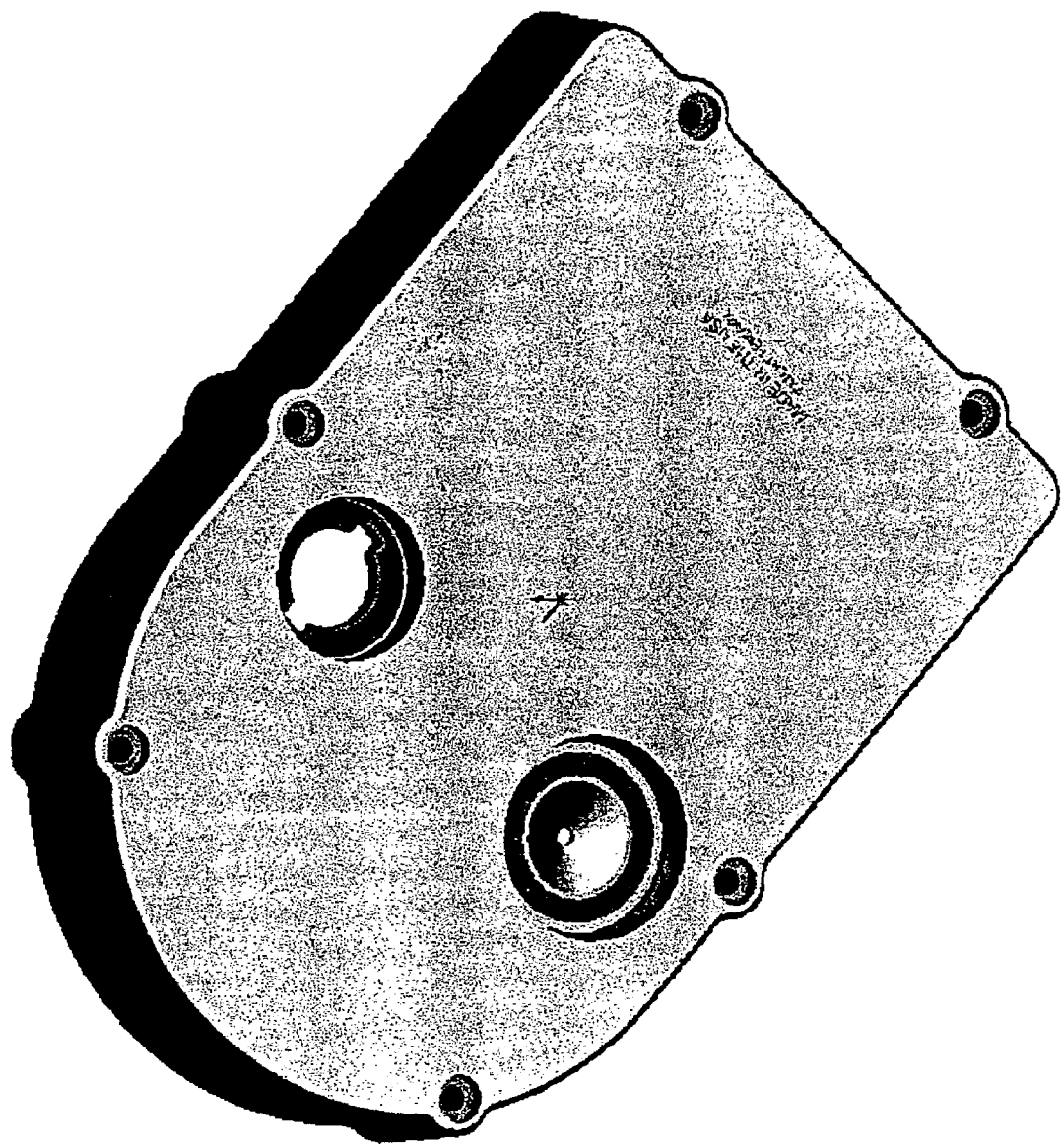
FIG. 9 shows one view of the top of the case.

The case of the electronic device can be made using any suitable method using any suitable material. One method of making the case is injection molding plastic. FIG. 7 shows a top view of bottom portion (40) showing channels for batteries and the speaker. FIG. 8 shows an inside view of the top portion (30) showing cutouts for the speaker, on-off switch and recharging receptacle. FIG. 9 shows an overhead view of the top portion (30) showing recharging receptacle and on-off switch.

Speaker (60) is preferably made with a plug to fit speaker attachment (160). Battery connectors (190) and (180) are made from any suitable material, such as 0.012 inch thick nickel-plated spring steel.

The material used for the case can be made of many different materials that is sufficiently chemically and pressure-resistant to function in the desired environment, such as ABS plastic from GE Polymerland-Espree, manufactured worldwide, or any of a variety of plastics optionally having additives such as fiberglass or carbon fiber additives, or any other suitable additive. Additives can be added in any suitable percentage, such as 1%, 5%, 10% or other percentages. The amount and composition of additives is designed to add strength to the case or other desired property, as known in the art. The composition of the case is selected to allow the case to withstand the water pressure at a desired depth. The case is also desired to have sufficient structural integrity to allow the case to withstand shock or impact (for example, attack by animals) the case may be subjected to. In one embodiment, the case can withstand forces present at 300 feet or below. The use of batteries may increase the structural integrity of the case.

Figure 10:
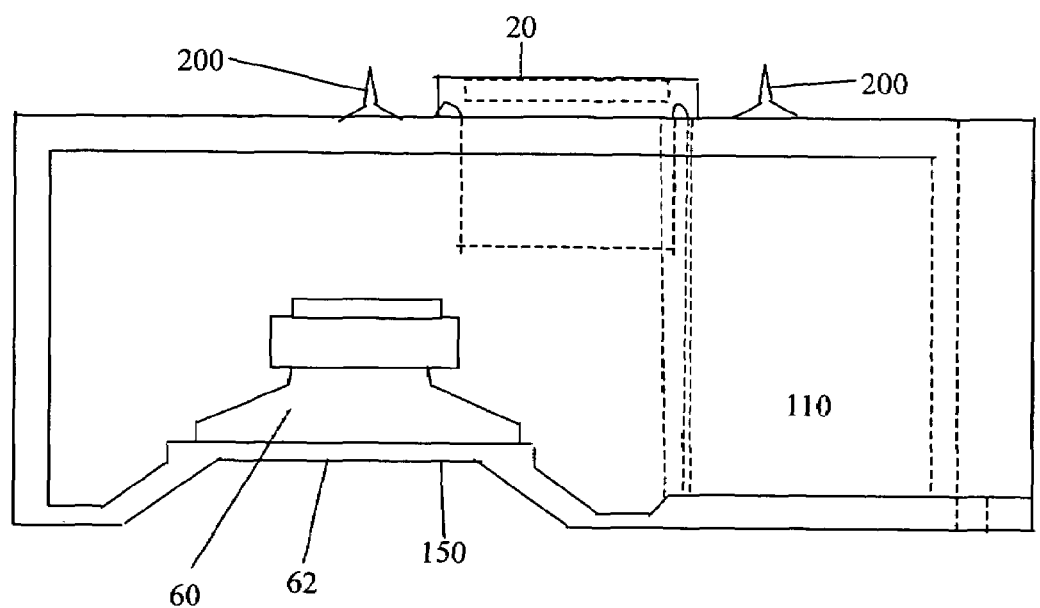
FIG. 10 shows a side view of the device.

In a preferred embodiment, the plastic on the top side of the device is thinner above the speaker location. This allows the plastic enclosure to act as a diaphragm for the acoustic signals emanating from the device. This feature is shown in FIG. 10 (62). Although the speaker 60 is shown positioned near the bottom of the device without a cutout in FIG. 10, the speaker may be positioned near or at the top surface or the bottom surface (i.e., with or without the cutout 150 shown in FIG. 10, or any position in between the top or bottom surface. Any desired depth of cutout 150 can be used, or no cutout can be used (i.e. the speaker is flush with the top or bottom surface). The cutout 150 is believed to act as an acoustic cavity.

In one preferred use of the device, the device is attached using attachment means 40 to a trap. A rope, fishing line, wire tie, or other suitable method is used. The device is turned on, and travels with the trap to the desired water depth. In one preferred embodiment, the trap and device are placed at a depth of about 300 ft of water.

Figure 11:
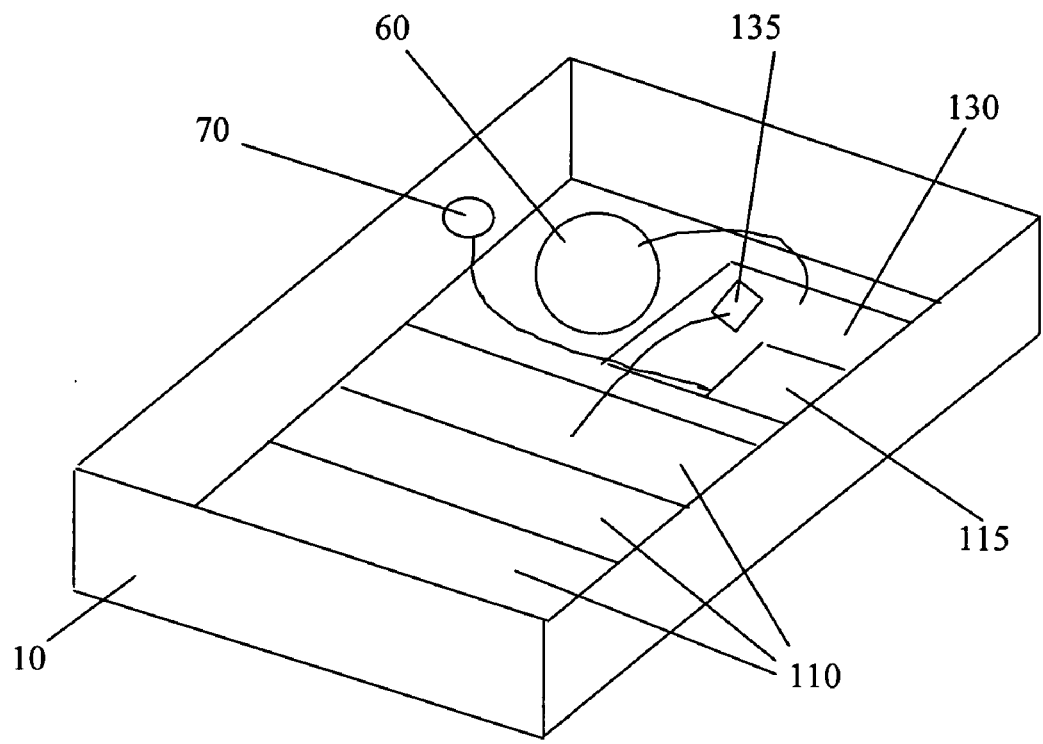
FIG. 11 shows the electric components of a device which can be used to affect the behavior of a marine animal.

FIG. 11 shows a schematic of the electrical components of the device shown in FIG. 3. In FIG. 11, housing 10 is shown open. On-off switch 70 is electrically connected to batteries 110 attached to sound prom 115, which is attached to sound board 130, with optional resistor 135. The sound board is attached to speaker 60. In one embodiment, speaker 60 is a 2⅛" diameter speaker with a frequency range of 0-17,000 Hz and 100 dB output. In one embodiment, sound board 130 is a Vinbon WHS 0317-V1.00 NS022. In one embodiment, sound prom 115 is an 8 pin Taiwan RA Ob29273397-142. FIG. 11 shows three 1.5V batteries connected in series, but any suitable type and number of batteries can be used, as long as there is enough power to run the device for the desired amount of time, as known in the art. Configurations of the device other than those shown in the figures and described herein, and components such as sound boards, speakers and sound proms other than those described herein may be used, as known in the art, as long as the device has the desired function as described herein.

In one embodiment of the device, the device is about 2¾ inches wide, 4 3/16 inches long, and 15/16 inches high. The device may be of other dimensions, as long as the desired components are present in the device.

FIG. 10 shows a side view of the device. In FIG. 10, speaker 60 is shown with thin plastic surrounding 62. On-off switch 20 is shown with optional guard fence 200. Guard fence 200 is used to prevent the device from being unintentionally turned on or off.

Figure 12:
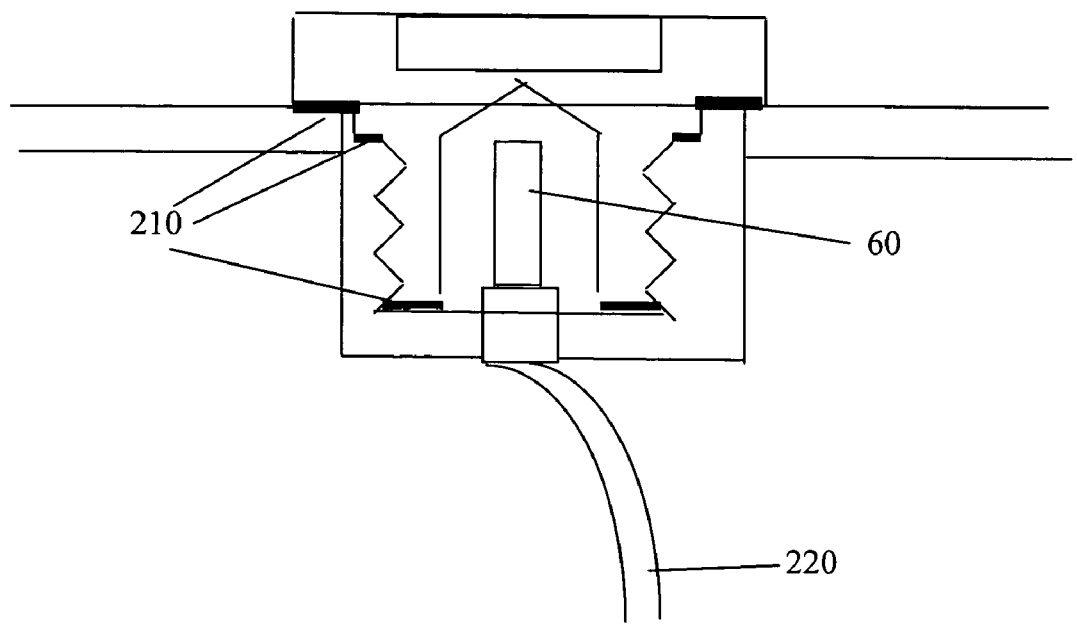
FIG. 12 shows the socket and plug mated together.

FIG. 12 shows the socket and plug detail for on-off switch 70 shown in FIG. 10. The socket can be part of a prefabricated design, or the socket can be welded separately, and then glued into the device. There are appropriate gaskets or o-rings or other suitable sealants used to make the socket and plug waterproof. Triple gaskets 210 are shown in FIG. 12. Also shown in FIG. 12 is wire 220 which connects on-off switch 60 to the rest of the device.

The case may be designed to float which would allow it to be washed ashore if the device becomes inoperative or is lost. A floating device may also assist in retrieval of the electronic device. This floatation is provided by many means, including the air present in the case, use of foam inserts, external floatation devices and other means known in the art. Floatation of the device decreases the ecological impact of a lost or damaged electronic device.

The corners of the case can be rounded or have a thickness gradient, for strength or sound enhancement. Round corners help prevent snagging of the case or injury to animals. The case may be shaped as a canister, or other suitable shape, as known in the art.

The material making up the case can contain color indicators, wherein a color change indicates a change in depth, temperature, salinity, or other variables. These color change indicators or additives and uses thereof are known to the art. In addition, the color of the case can be changed to indicate a variety of information to the user. Some information includes the following: the depth at which the device is useful, the animals the electronic device is configured to attract or repel, the manufacture or distribution date of the device, the entity the device is leased to, the charge date of the batteries, and other useful information that will be appreciated by one of ordinary skill in the art. In addition, a camouflage color can be used to hide the electronic device from certain animals. A bright or "neon" color can be used to make the electronic device easier to see for retrieval purposes. The surface of the case can be written on using suitable devices or engravers, as known in the art. The color of the case can make any engraving or writing on the case easier to see.

A clear material can be used to construct the case or parts of the case. This allows visualization of lights or other indicators for the on/off status of the electronic device, a measure of the battery power left, or other status indicators. A clear case or portion allows the user to read instructions placed inside the case. A clear case or portion allows visualization of leaks inside the case, visualization for visible damage or broken wires or other parts and structures, and visualization of battery corrosion.

The thickness and materials of the case can be used to correct for distortions caused by transmitting the sound through the case. Thinner material over the speaker can increase the sound pressure level transmitted through the material. The dimensions and internal ribs of the case are designed to add structural integrity under high water pressure and minimize vibration of the batteries which could distort the sound.

The case can include a variety of switches, including a magnetic on/off switch and others, as known in the art. Switch covers, as known in the art, can be used to reduce dirt and other contamination.

Figure 13:
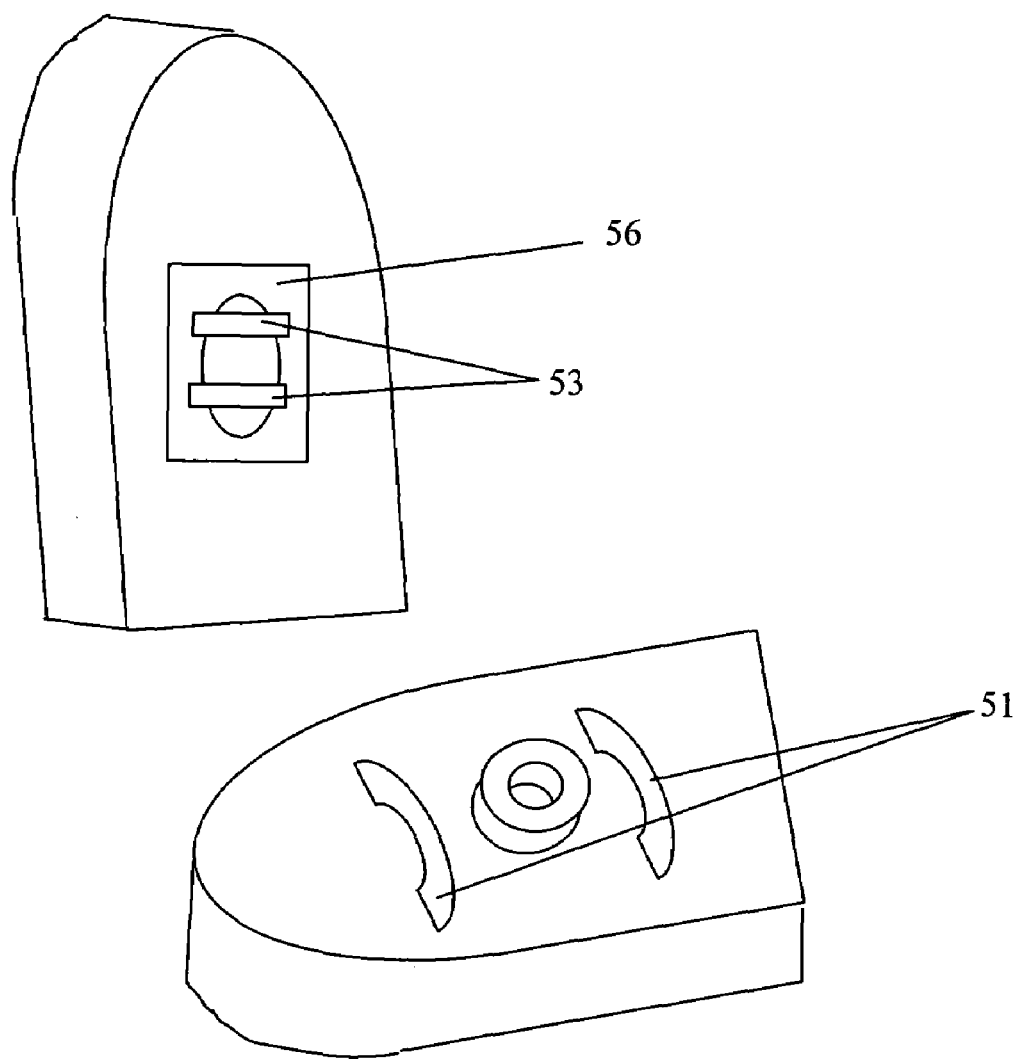
FIG. 13 shows one embodiment of the speaker design.

If desired, the case material over the speaker can be removed from the case and a separate diaphragm attached (56) by any suitable means such as glue. This is shown in FIG. 13. FIG. 13 also shows protection bars (53) to keep the diaphragm off of the speaker even upon application of water pressure. FIG. 13 also shows a guard fence (51) surrounding the speaker to protect from damage. In one diaphragm design, the thickness of the material is about 0.045 inches over the speaker, and the thickness increases to about 0.140 inches away from the diaphragm. The diaphragm can be made of any desired material, such as plastic, stainless steel foil, titanium or any material that provides the desired level of sound transmission.

FIG. 46 shows four different examples of the electronic device. FIG. 46A shows the use of a cone for a speaker-like effect. FIG. 46A shows an optional "grate" over the speaker to protect the speaker from damage. FIG. 46B shows a different cone design. FIG. 46C shows a metal layer covering the speaker. FIG. 46D shows a cone-shaped speaker-covering and metal antennae which vibrate. The metal antennae are believed to increase the overall frequency response. FIGS. 46B and 46D show additional surface area transmitting the signal underwater. The additional surface area is believed to transmit more signal through additional wave action and/or additional signal transmission area.

Figure 14:
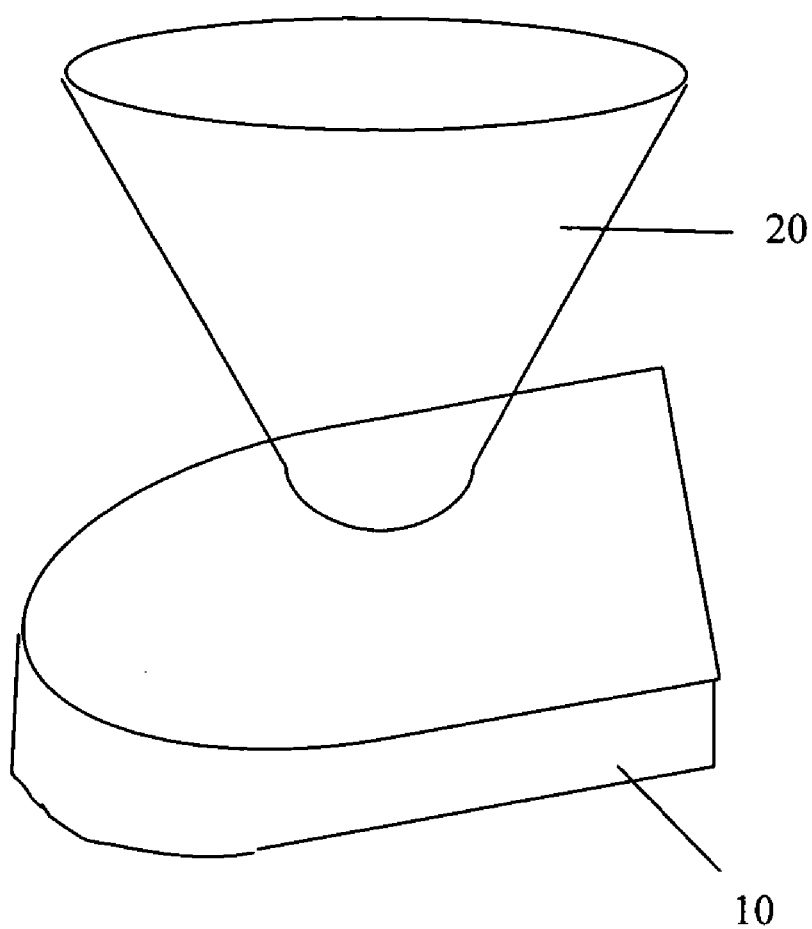
FIG. 14 shows one embodiment of a speaker design.

An alternative speaker design, such as that shown in FIG. 14, can be used to modify the sound. In FIG. 14, the electronic device (10) is used with a megaphone speaker (20). The top of the megaphone speaker may be covered with a different material or thickness of material, such as a thinner material than the material making up the rest of the speaker. The different thickness can alter the sound played back, or perform a variety of different functions, as known in the art. The case can be used without a conventional speaker using a piezoelectric sound production device, as known in the art.

In a device, one acoustic signal may continuously repeat, or different acoustic signals can be played depending on the desired behavior affectation. Remote activation of the device can be used; for example, acoustic signals are only played when animals have been sighted. The device may also be equipped with a motion or temperature sensor to activate or deactivate depending on the presence or absence of animals, or when the water reaches a certain temperature.

In a preferred embodiment, the device is waterproof to 100 meters, the acoustic signal is heard for a 40 meter radius and the battery lasts for 2 weeks of continuous use. Modifications in the radius in which the acoustic signal travels are easily made by changing the size of the speaker and/or battery, and are well within the skill of one of ordinary skill in the art using the description provided herein.

EXAMPLES

Acoustic signals from spiny lobsters were recorded in the near shore waters of Florida bay adjacent to the upper Florida Keys. Acoustic signals were recorded using an Arretec Dolphin Ear Hydrophone on a Radio Shack Model—DR 81 digital recorder. The acoustic signals were edited to isolate individual sound trains from a mixture of sounds so that they could be tested separately using the software accompanying the Hydrophone DE981812 and played back using a Clark Synthesis underwater speaker driven by a Lubell Lab Model TA160 underwater amplifier. Non-naturally occurring sounds such as prop sounds from boats are preferably removed. Editing of acoustic signals is performed using any of a number of programs known in the art. One such program is the software accompanying the Hydrophone DE981812. Other programs are known in the art.

Figure 15:
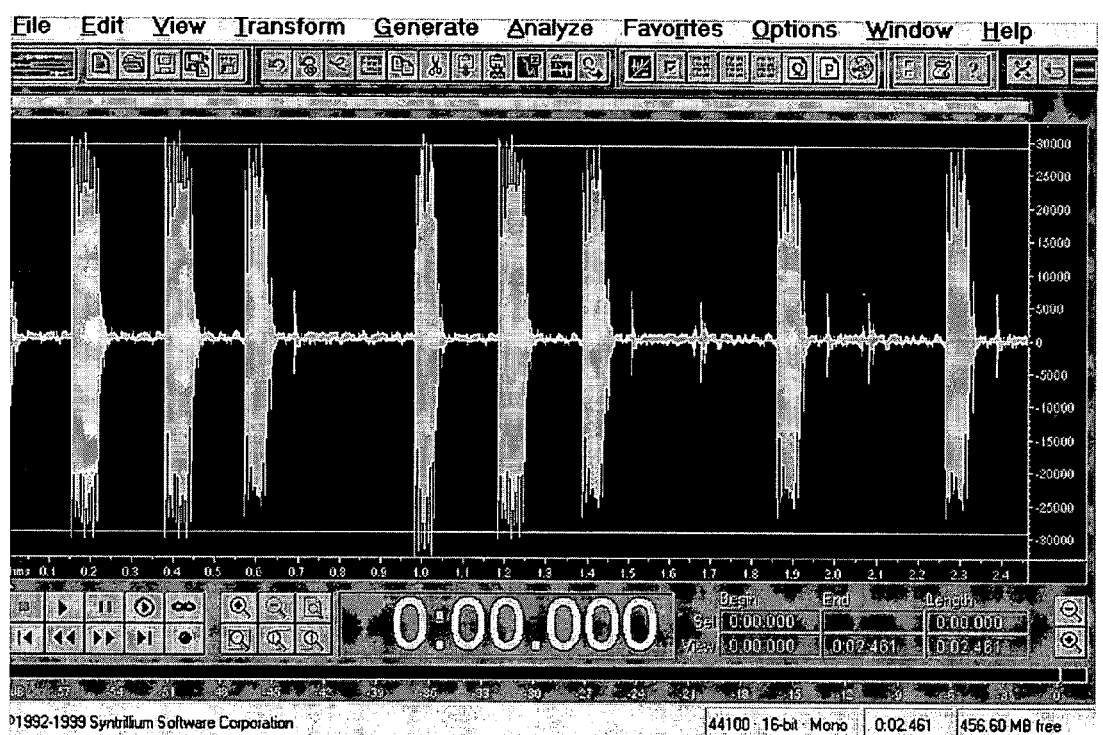
FIGS. 15-21 show waveforms of recorded lobster acoustic signals.
Figure 16:
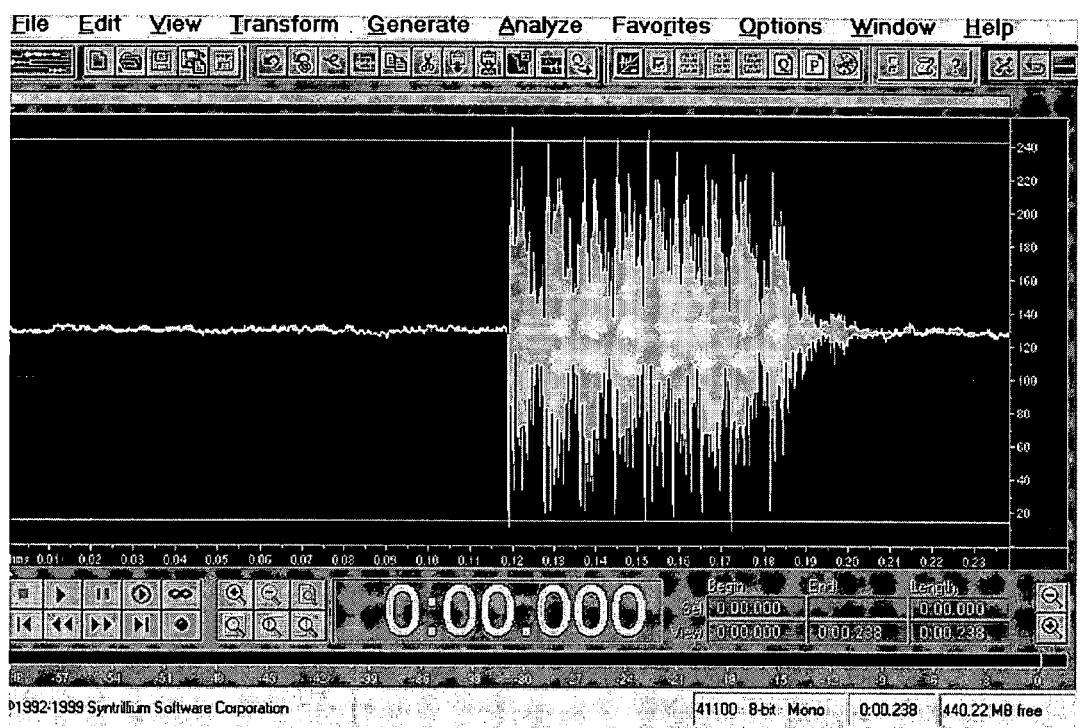
Figure 17:
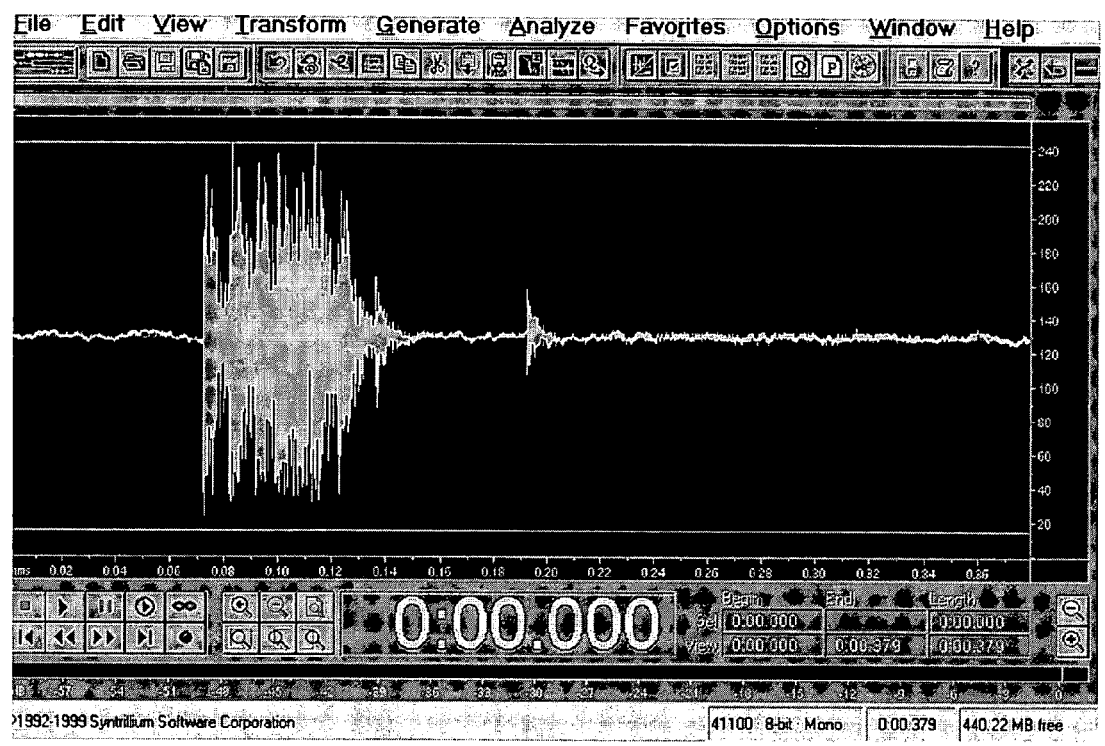
Figure 18:
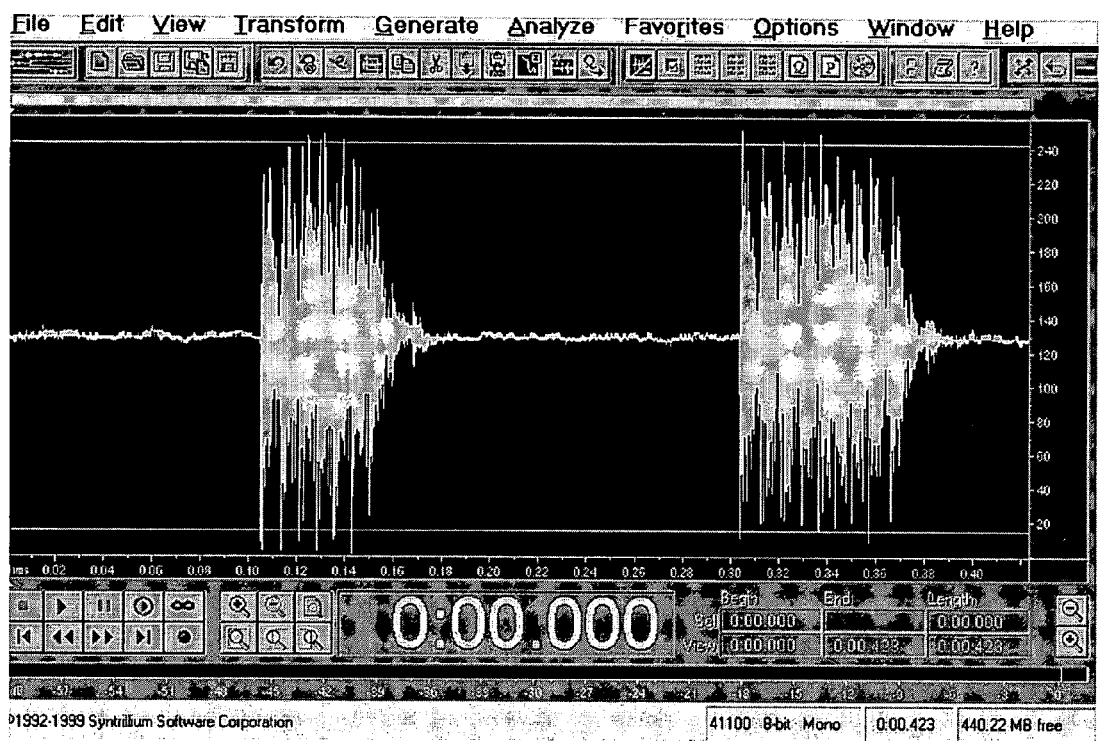
Figure 19:
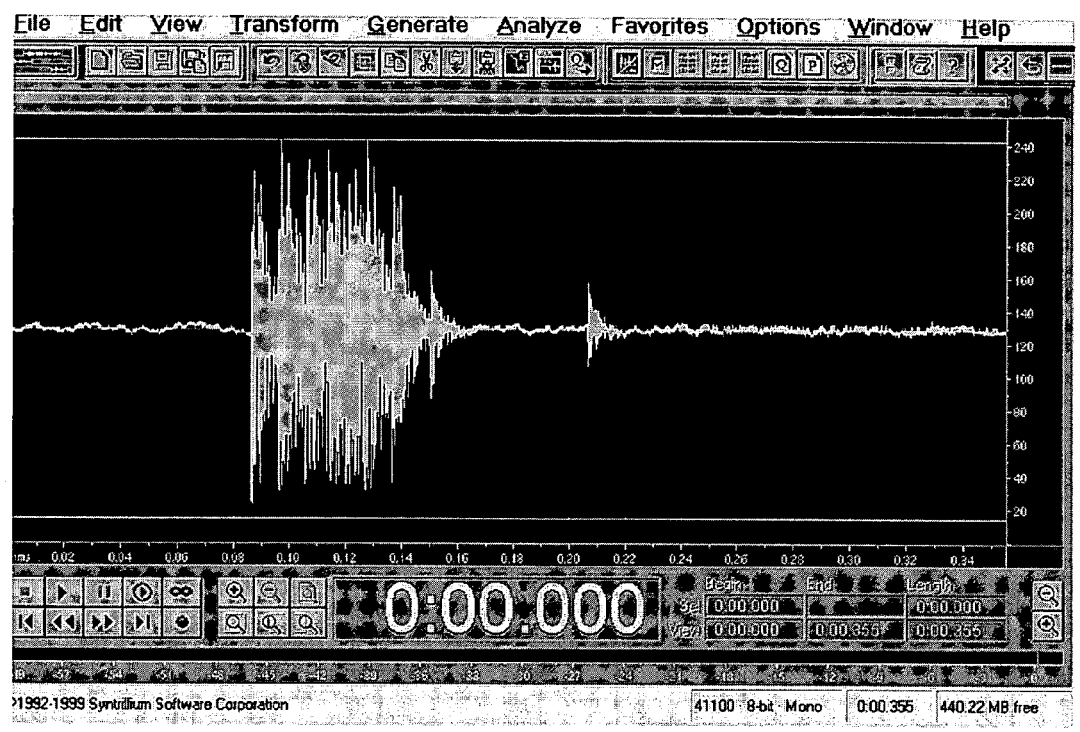
Figure 20:
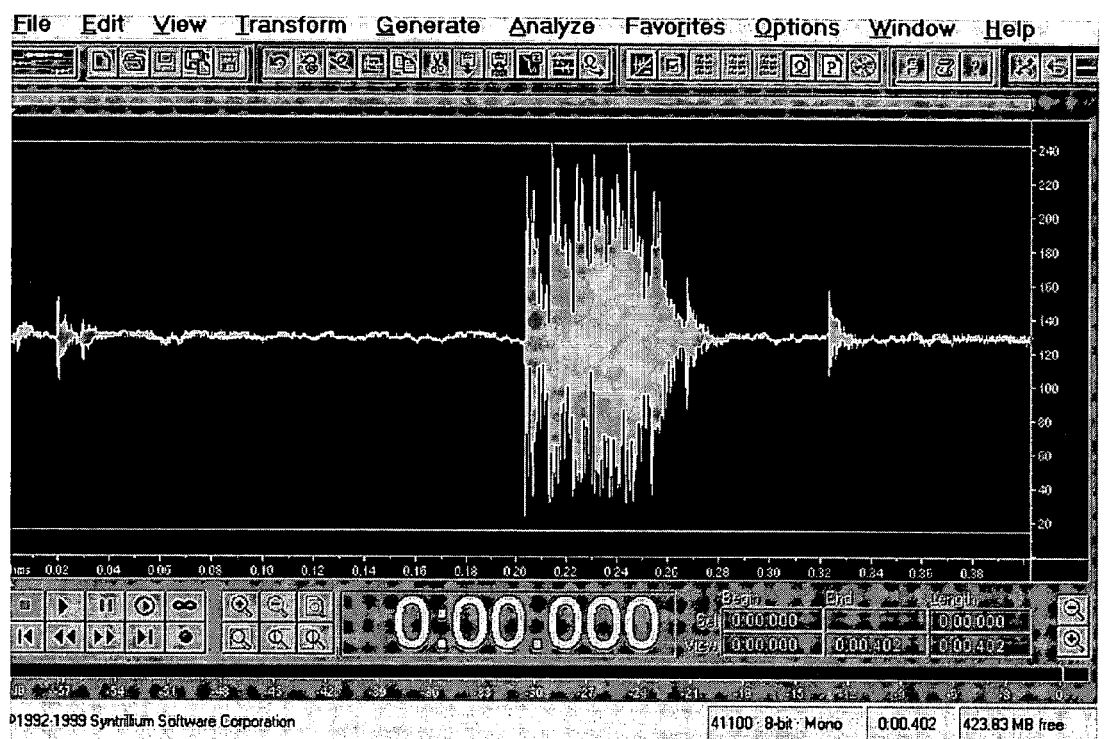
Figure 21:
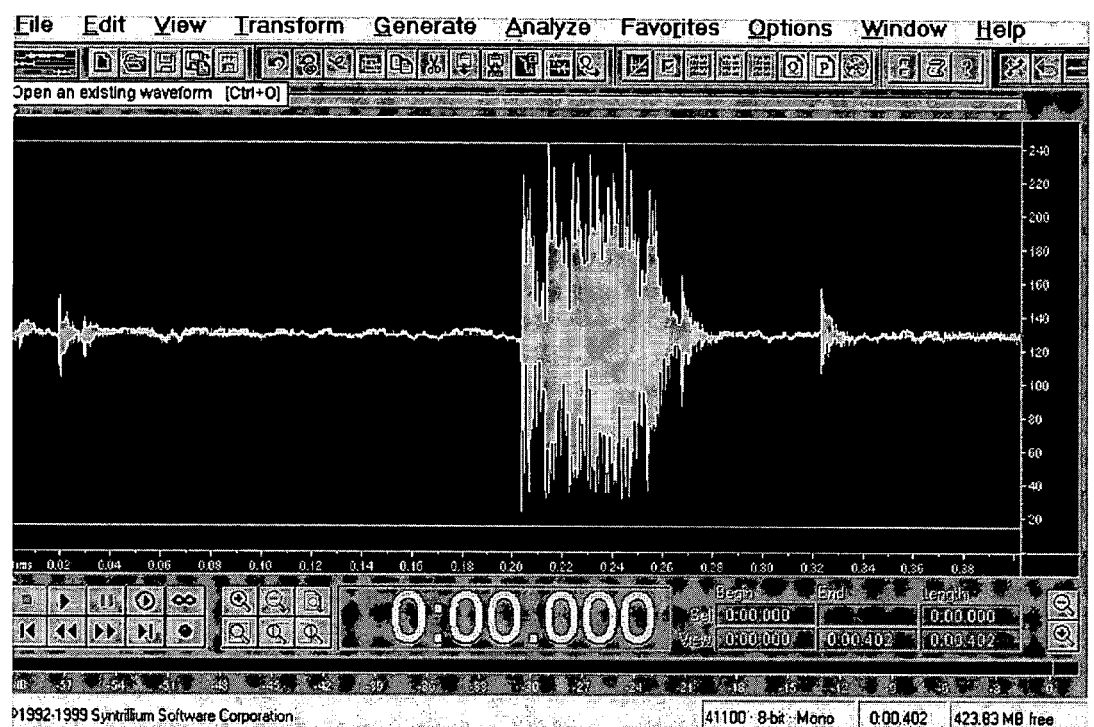
Figure 22:
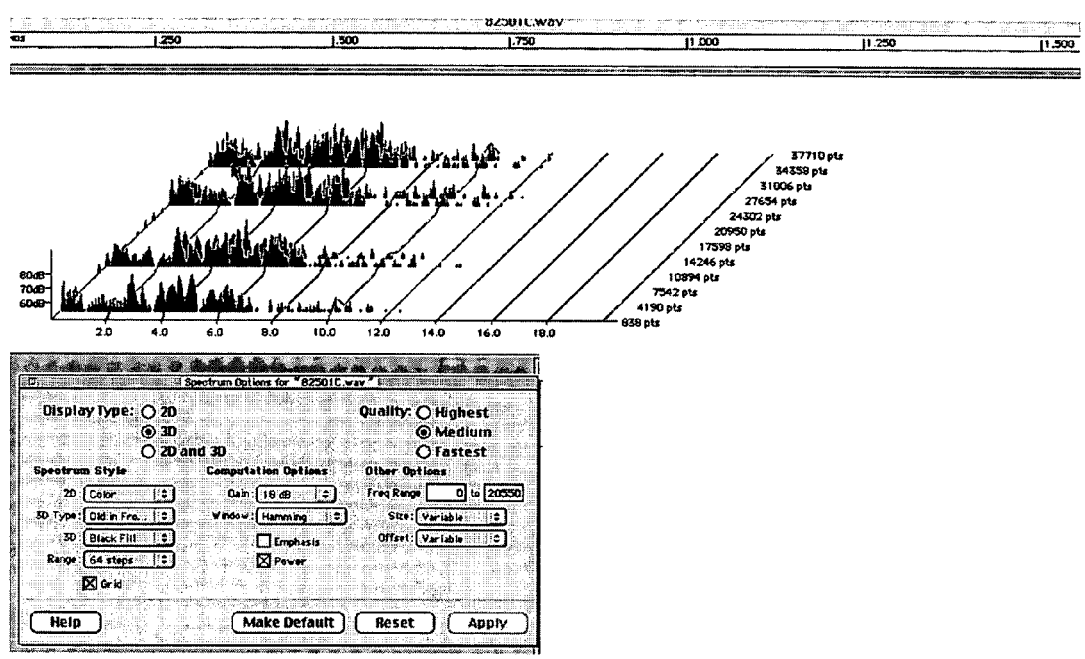
FIGS. 22-24 show different presentations of the sound in FIG. 1.
Figure 23:
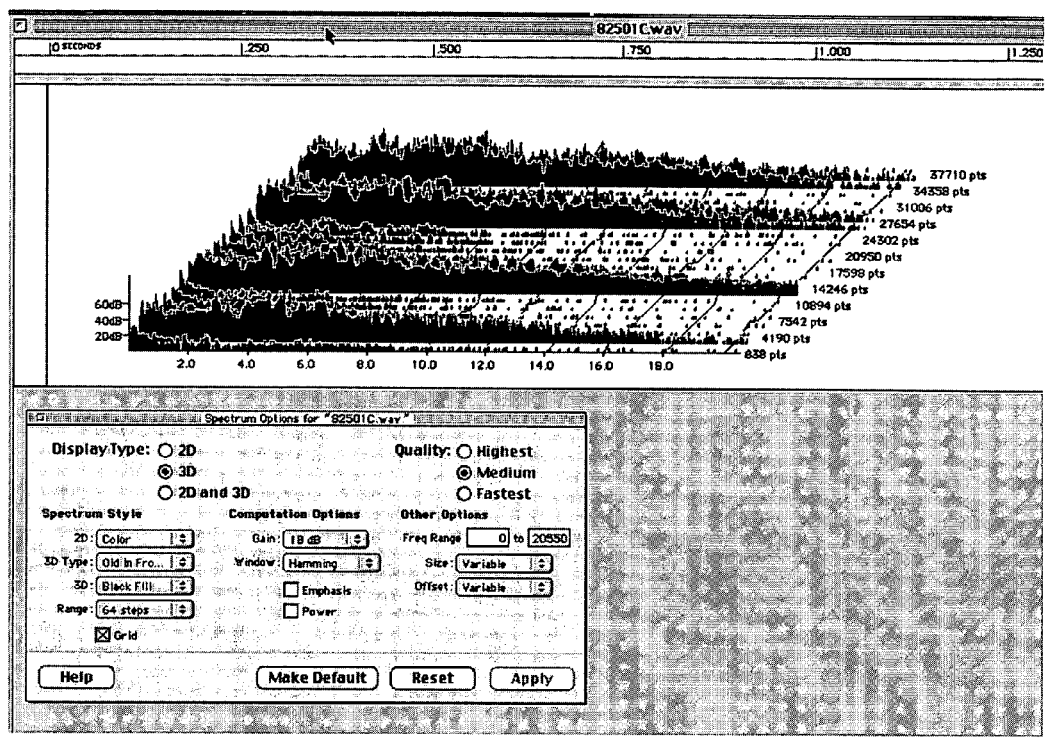
Figure 24:
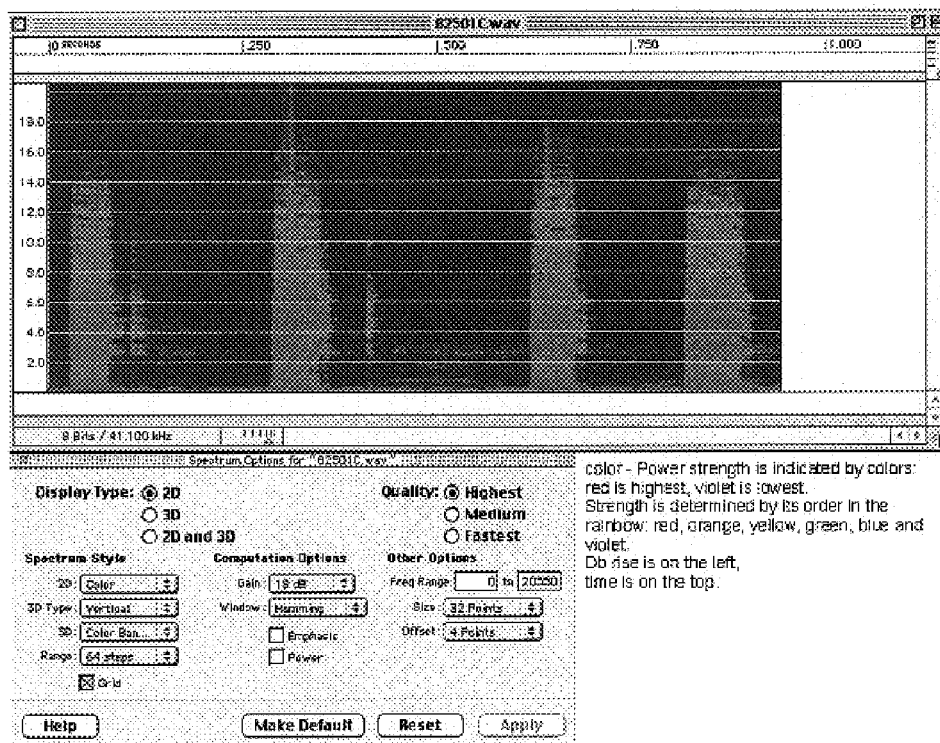
Figure 25:
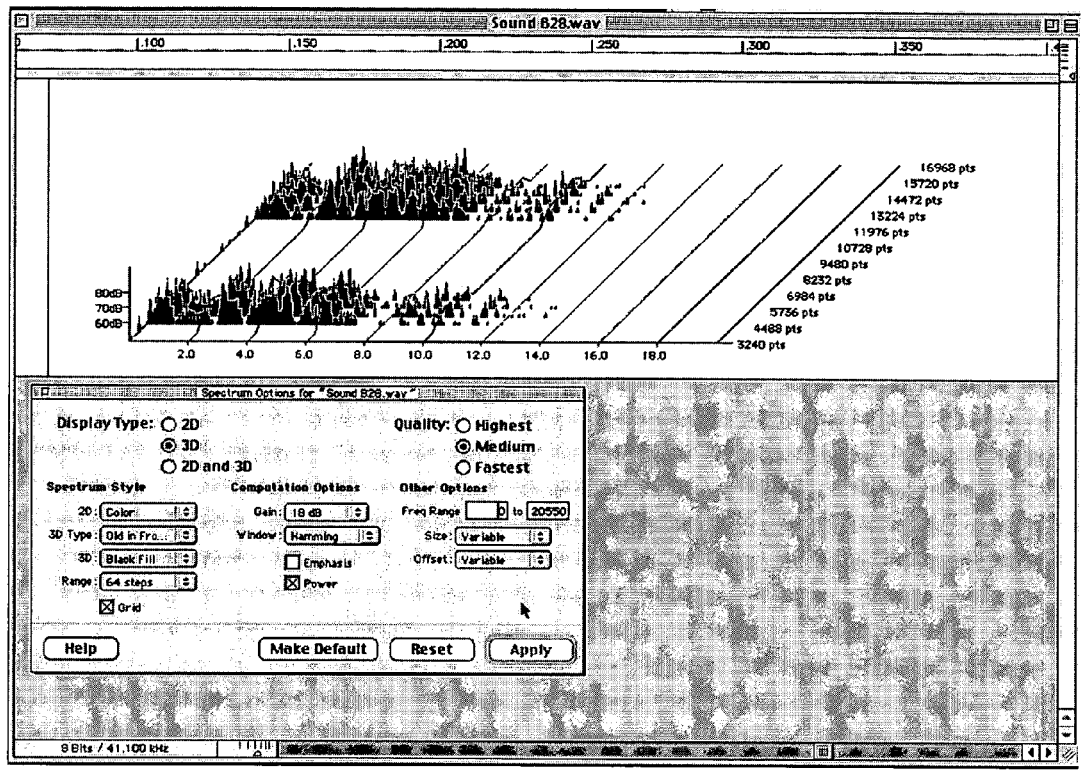
FIG. 25 shows different presentations of the sound in FIG. 2.
Figure 26:
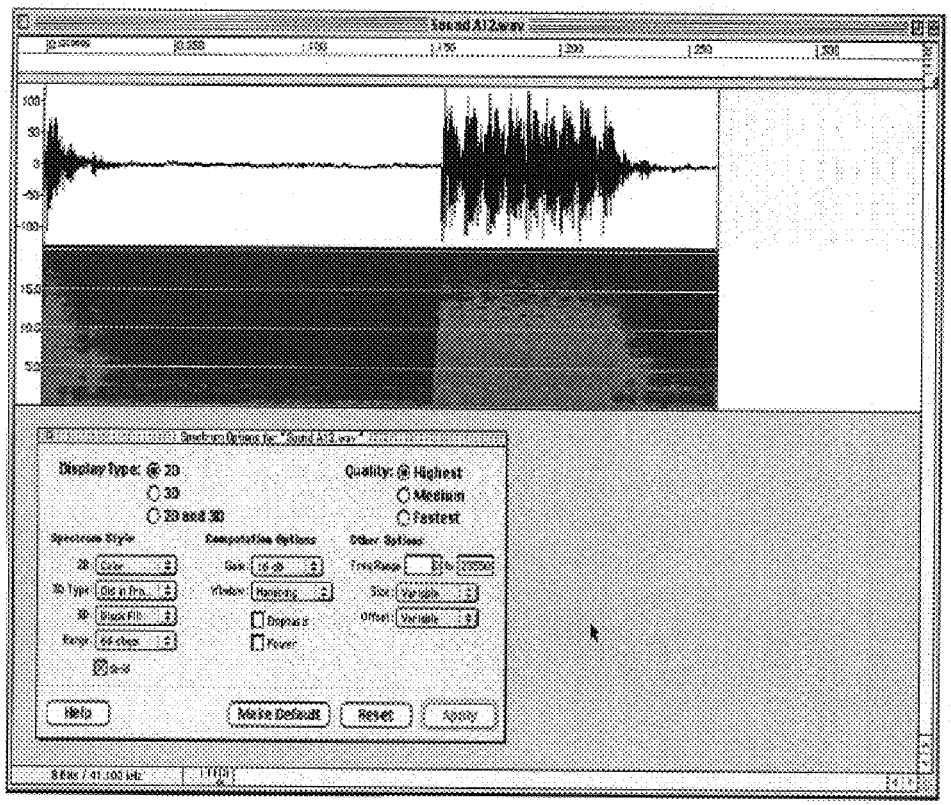
FIG. 26 shows the waveform and color spectrum of sound A12.
Figure 27:
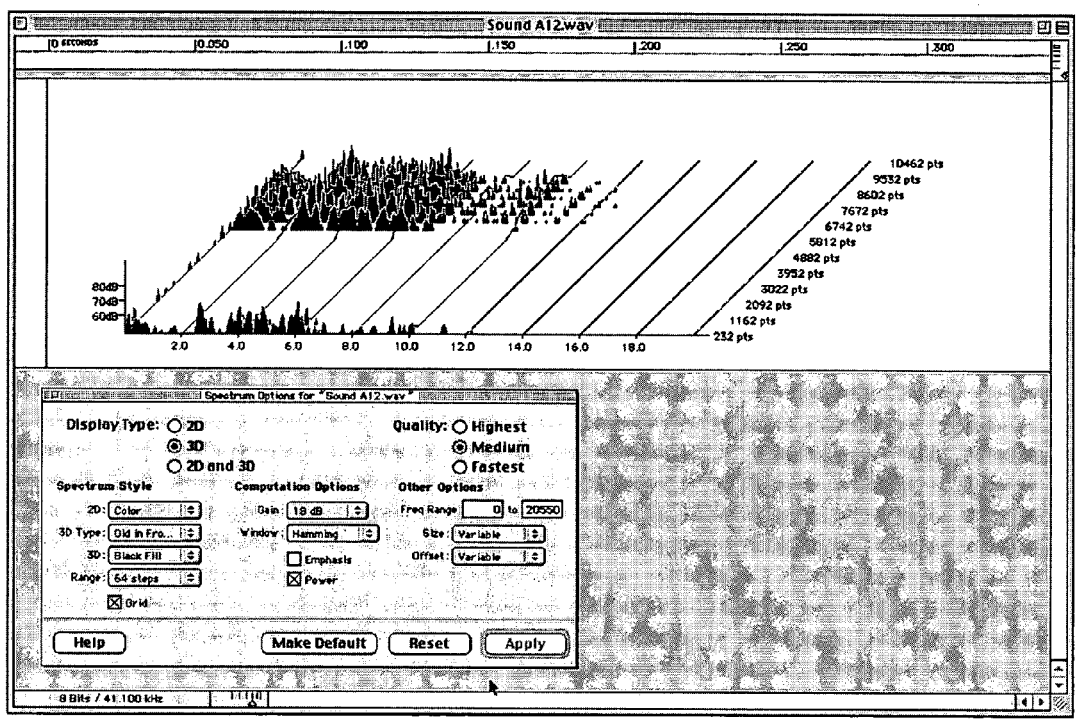
FIG. 27 shows the spectrum of sound A12.
Figure 28:
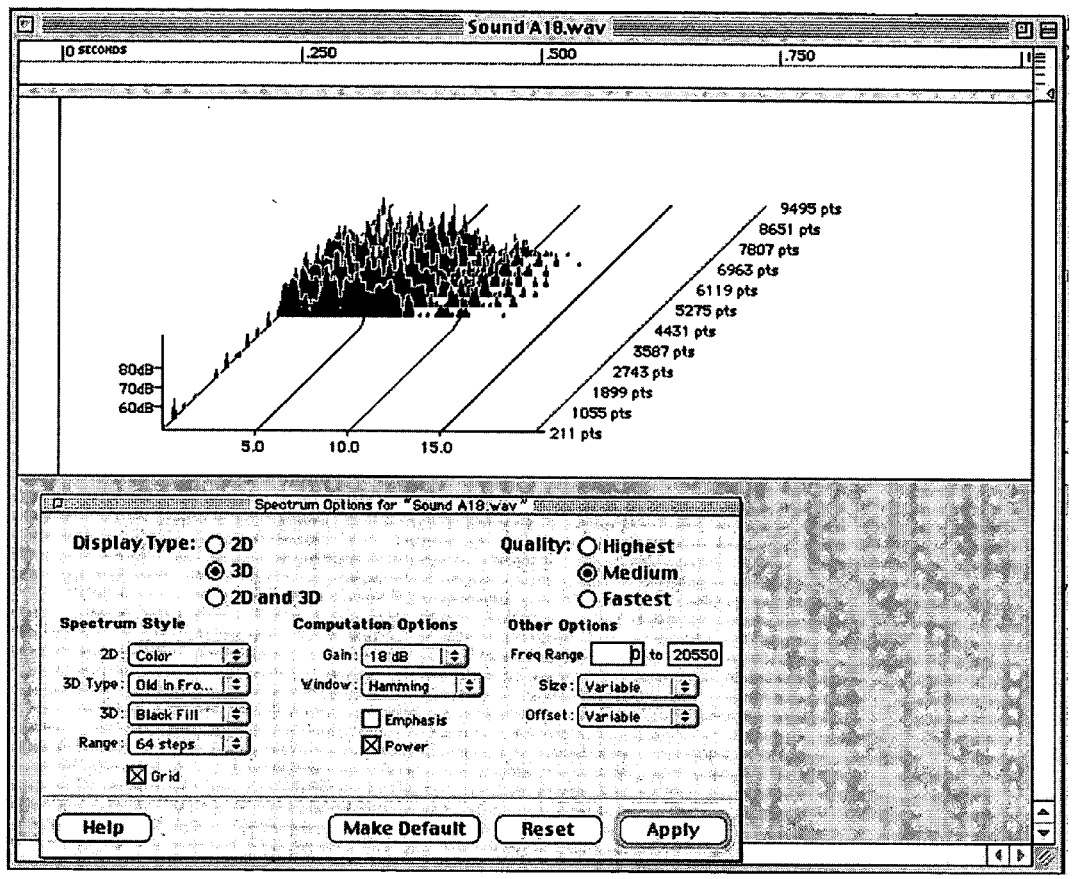
FIG. 28 shows the spectrum of sound A18.
Figure 29:
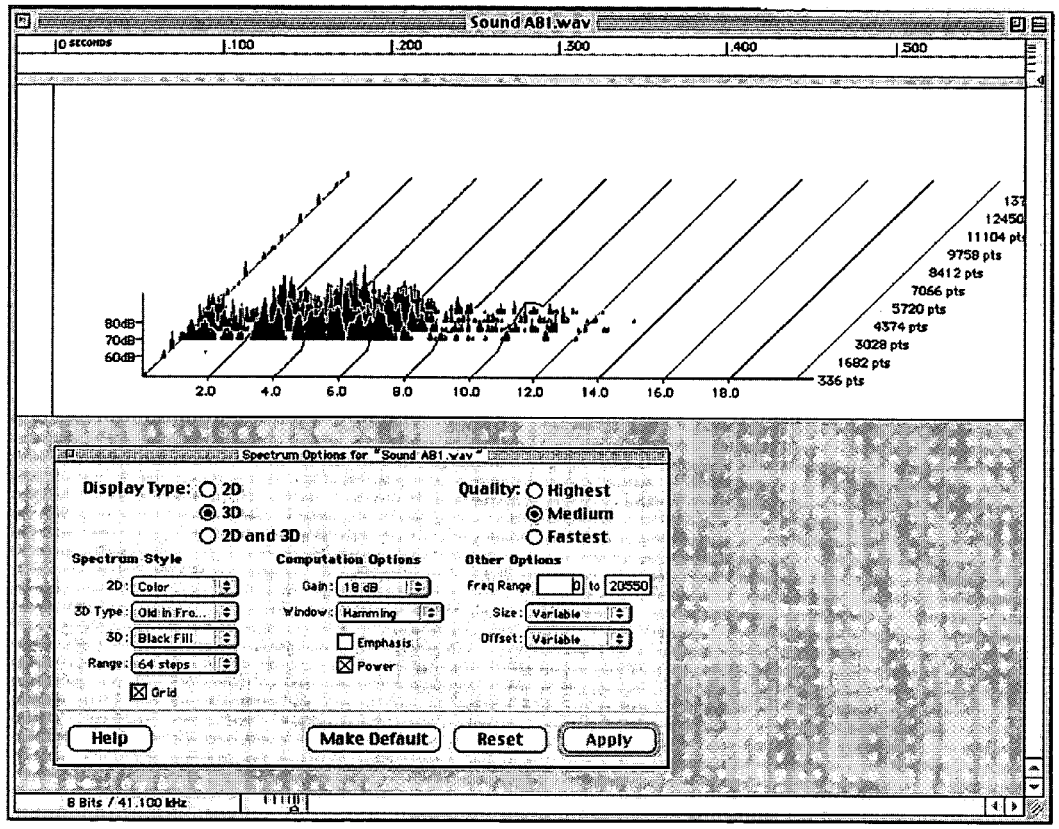
FIG. 29 shows the spectrum of sound A81.
Figure 30:
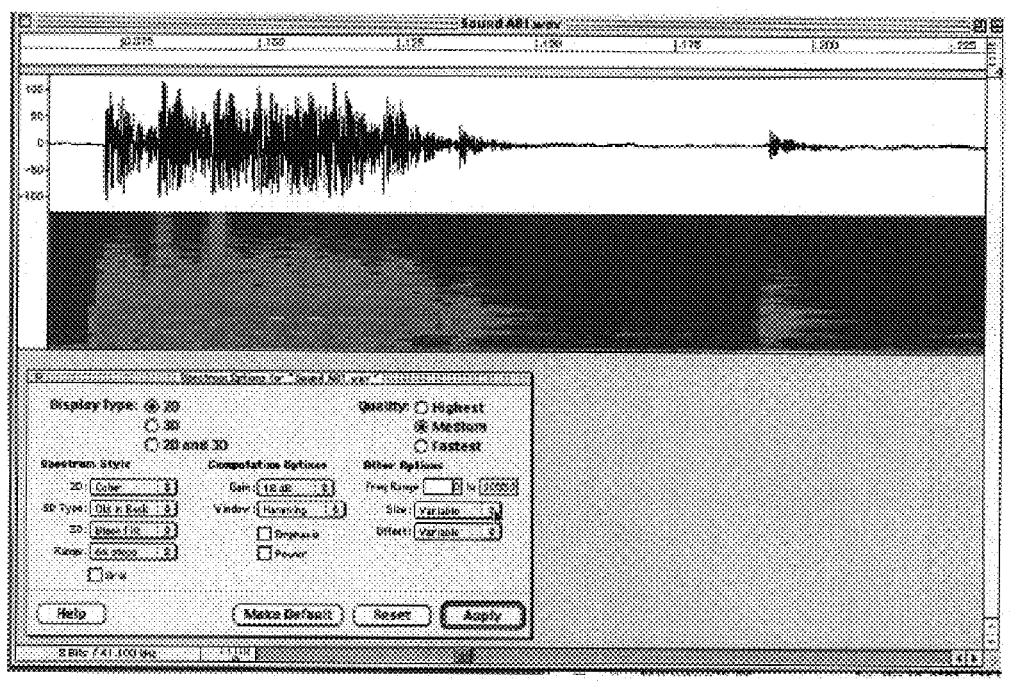
FIG. 30 shows a color spectrum of sound A81.
Figure 31:
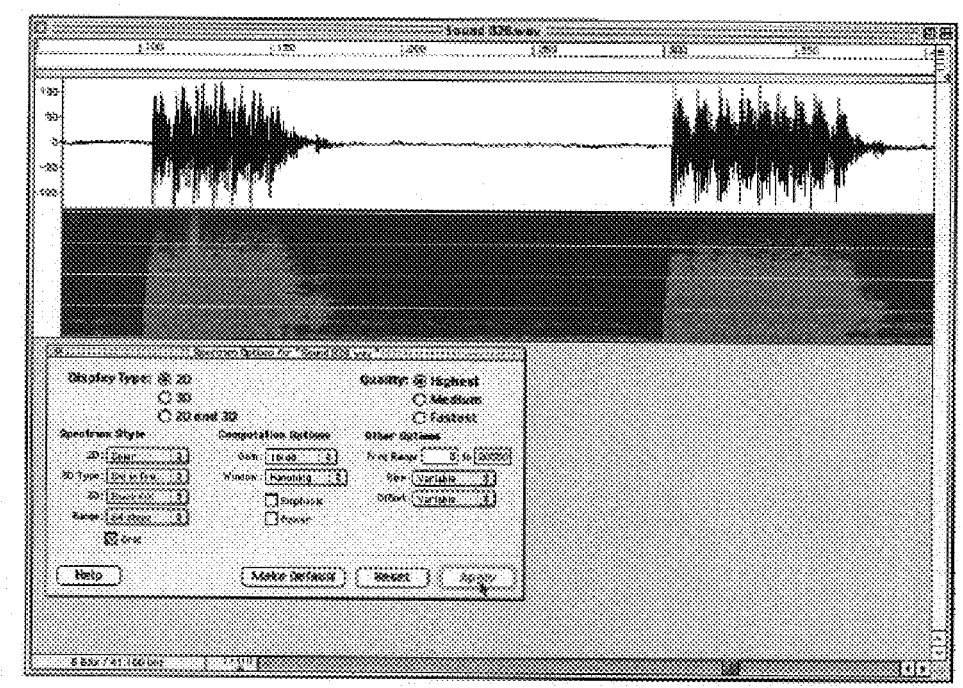
FIG. 31 shows a color spectrum of sound B28.
Figure 32:
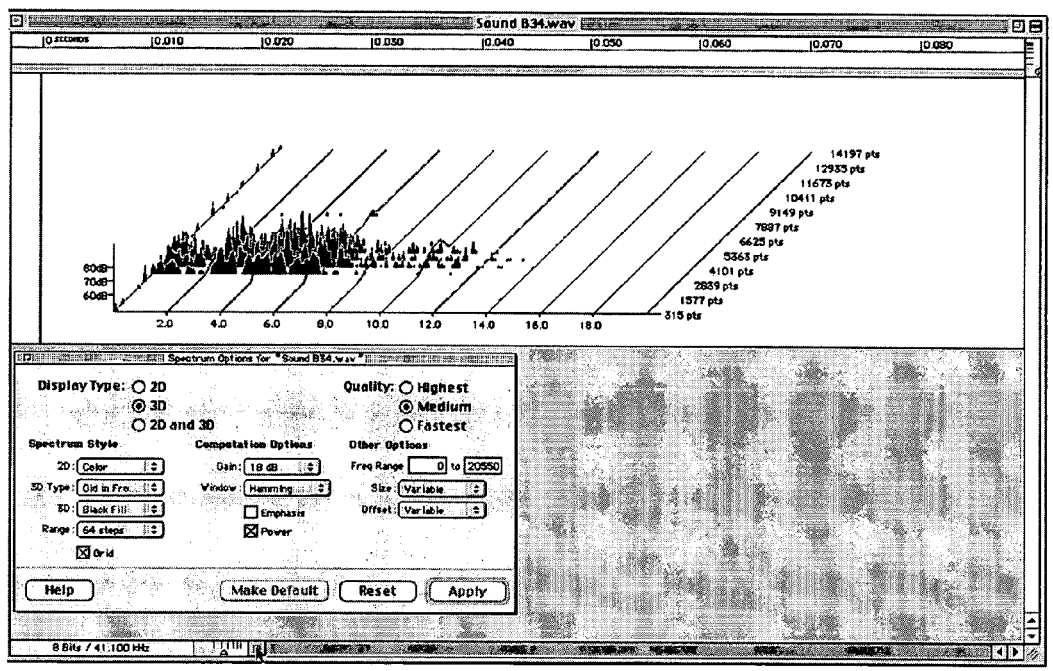
FIG. 32 shows the spectrum of sound B34.
Figure 33:
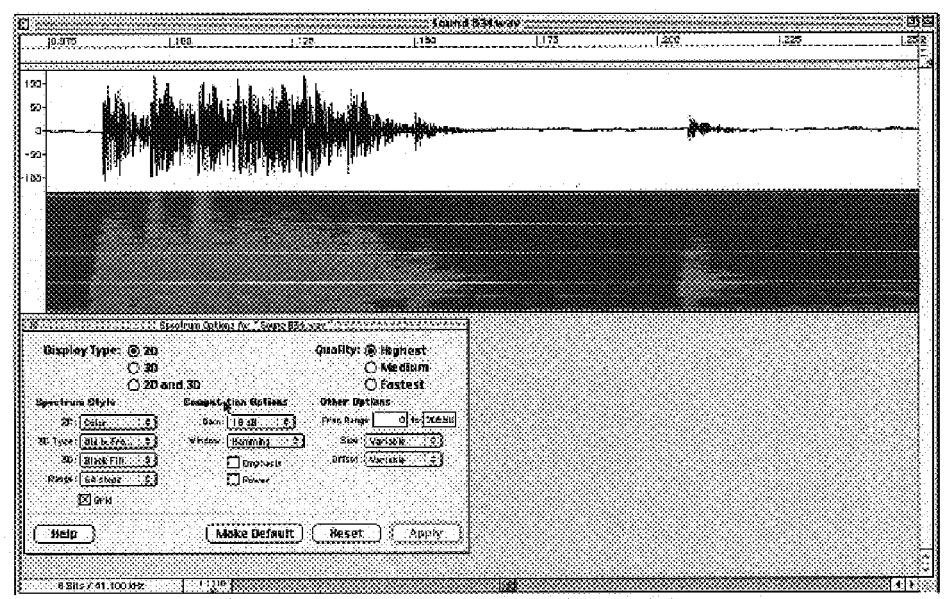
FIG. 33 shows a color spectrum of sound B34.
Figure 34:
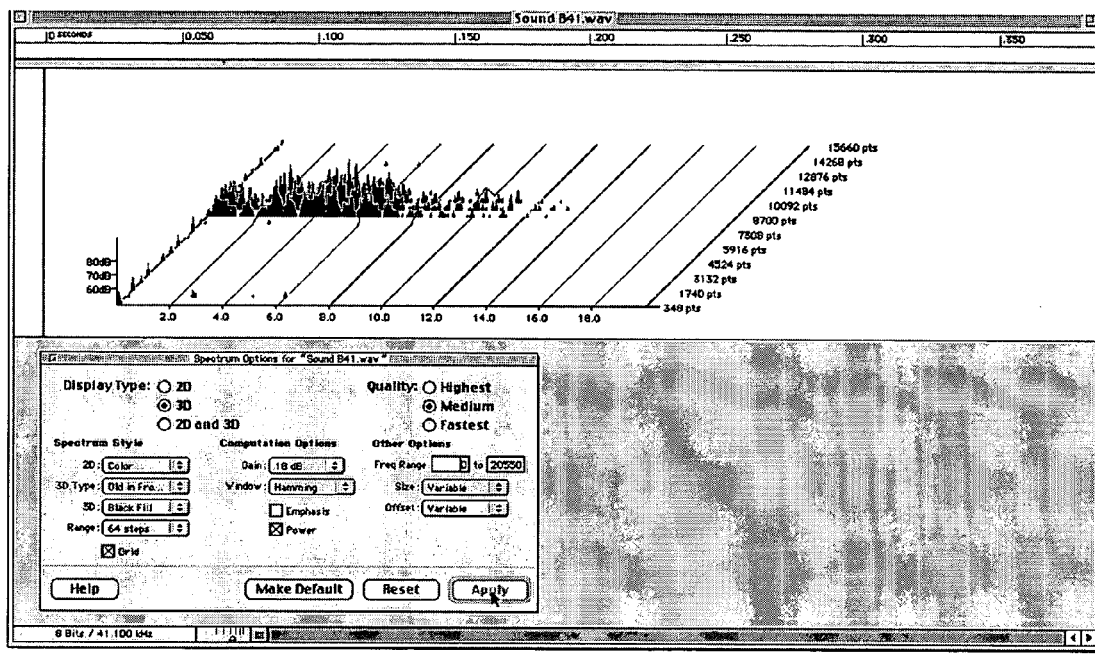
FIG. 34 shows the spectrum of sound B41.
Figure 35:
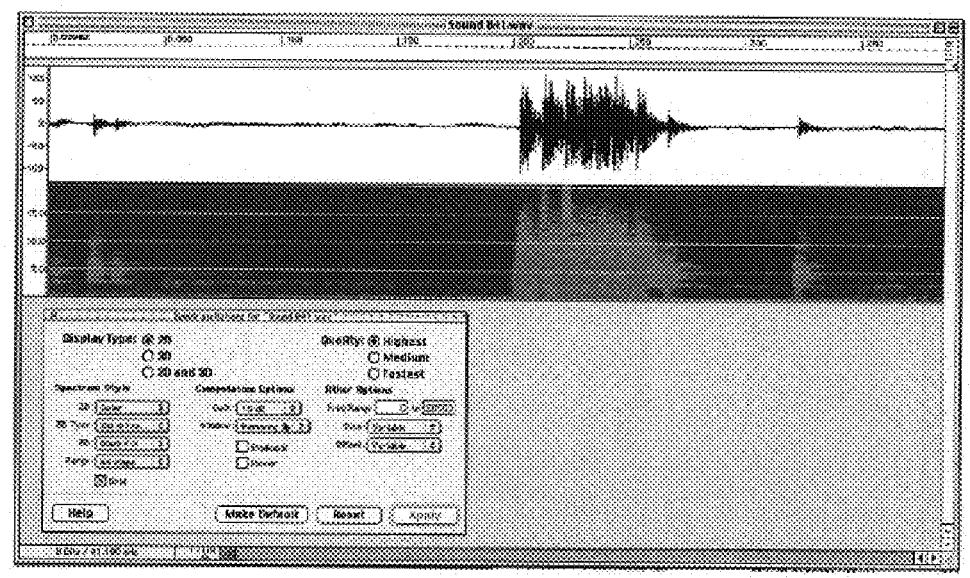
FIG. 35 shows a color spectrum of sound B41.
Figure 36:
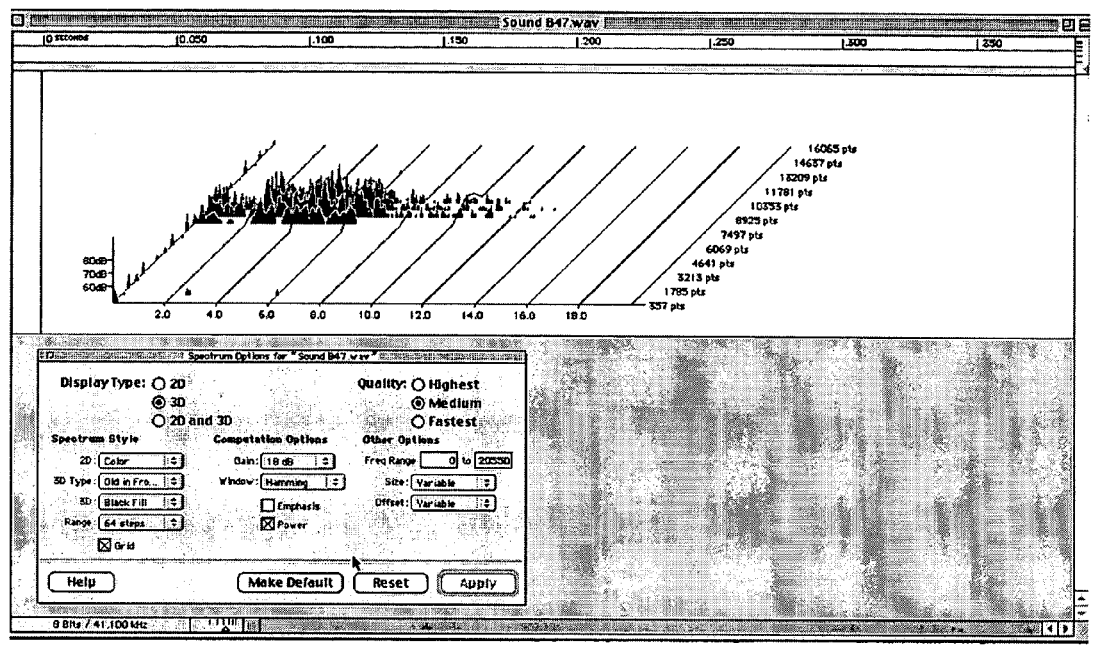
FIG. 36 shows the spectrum of sound B47.
Figure 37:
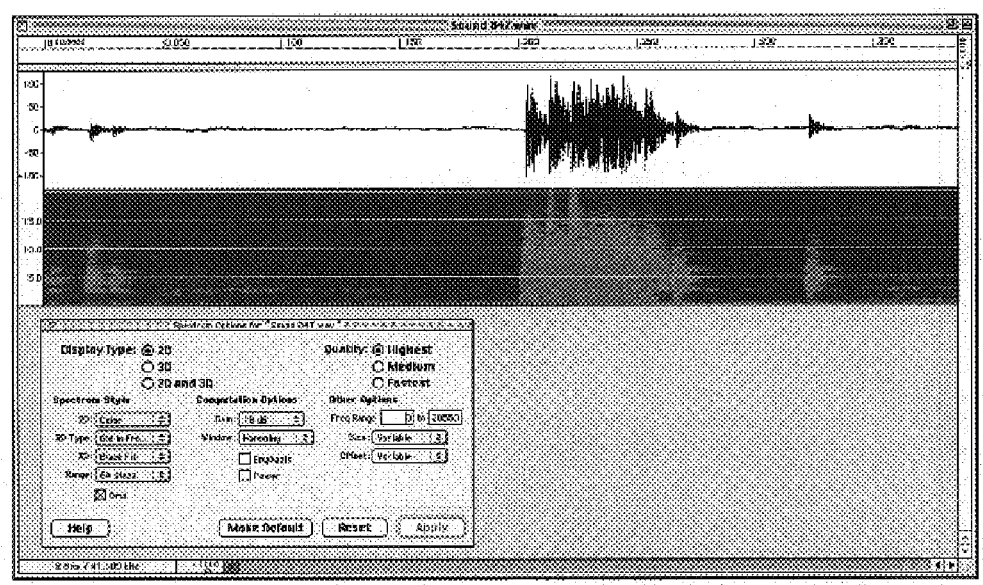
FIG. 37 shows the color spectrum of sound B47.
Figure 38:
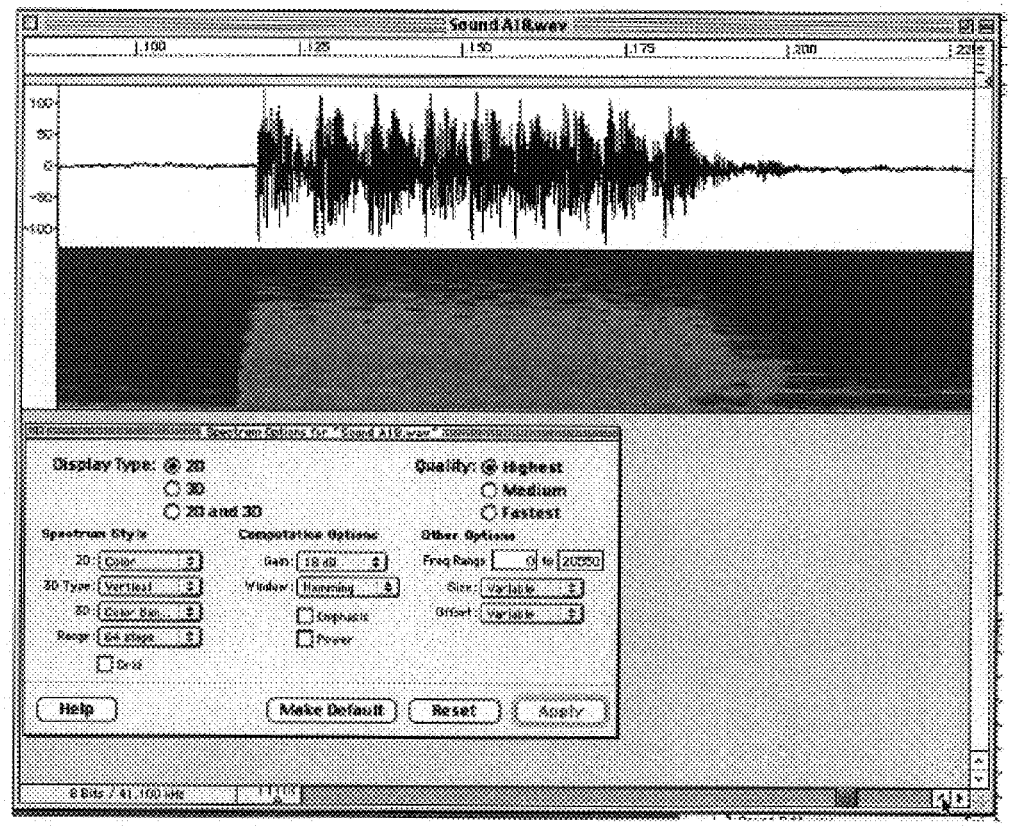
FIG. 38 shows the color spectrum of sound A18.

There are eight recorded sounds, designated 82501c, A12, A18, A8, B28, B34, B41 and B47 present on the enclosed compact disc and graphically represented by the corresponding figures herein. The waveform in FIG. 1 corresponds to sound 82501c. The waveform in FIG. 15 is a compilation of all sounds. The waveform in FIG. 16 corresponds to sound A19. The waveform in FIG. 17 corresponds to sound A81. The waveform in FIG. 18 corresponds to sound B28. The waveform in FIG. 19 corresponds to sound B34. The waveform in FIG. 20 corresponds to sound B41. The waveform in FIG. 21 corresponds to sound B47. FIGS. 22-38 show different presentations of the sounds, as described in the Figure and herein. In the color figures, the power strength is indicated by color, as described in the caption for FIG. 24.

Responses of the lobsters to the recordings was visually monitored and varied considerably. A red filter was used on the light used to observe the lobsters. The red filter was selected as least disruptive of the colors tested. Most recordings elicited no visible response. One acoustic signal (shown in FIG. 1) attracted 3-8 Florida spiny *Panulirus Argus* lobsters in a period of 3 hours in June 2001. 12 replications of the experiment of playing the acoustic signal shown in FIG. 1 all showed lobsters moving to the speaker. In January and February of 2002 (the middle of the commercial season when water temperatures dropped to the low 70's F), two or three lobsters were attracted to the speaker in a three-hour period. This acoustic signal is designated as an attractive acoustic signal.

Another acoustic signal (shown in FIG. 2) caused the lobsters to chew on the cord attached to the speaker. This acoustic signal is designated as an agitative acoustic signal.

There are many procedures that can be used to edit the lobster sounds to determine which sounds result in a behavior change. In one experiment useful to determine which sound trains cause a behavioral effect in lobsters, the signal was edited as described herein to isolate individual sound trains and each train was played back. The behavior of the lobsters in response to the sound was visually observed.

Figure 47:
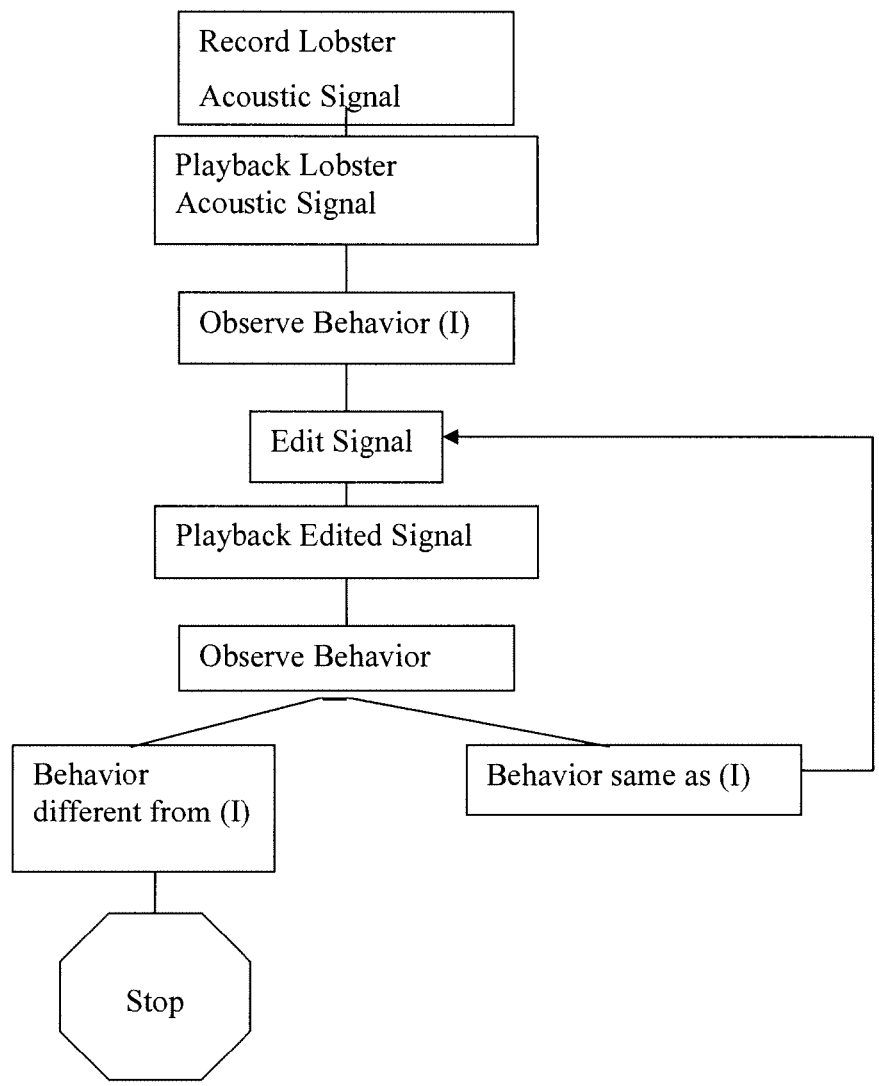
FIG. 47 shows a flow chart of one procedure to edit lobster sounds.

In another procedure, the experiment diagrammed in FIG. 47 can be used. A lobster acoustic signal is recorded. The acoustic signal as recorded ("unedited acoustic signal") is played back underwater, and the behavior of lobsters observed. If there is no observable behavioral effect, then a different acoustic signal is selected, until an acoustic signal that elicits an observable behavioral response is played. The unedited acoustic signal is then edited ("first edited acoustic signal"). The first edited acoustic signal is played back underwater, and the behavior of lobsters observed. If the lobster behavior resulting from playing the unedited acoustic signal and the first edited acoustic signal are the same, then the editing did not remove required elements of the acoustic signal, and the acoustic signal is edited again ("second edited acoustic signal"). The second edited acoustic signal is played back underwater, and the behavior of lobsters is observed. If the lobster behavior from the first edited acoustic signal and the second edited acoustic signal are the same, the acoustic signal is edited again, and the process continues as described above until the behavior is different. When the behavior from the edited acoustic signal and either the unedited acoustic signal or the previously edited acoustic signal is different, it is determined that the frequencies last removed are required to affect the desired lobster behavior.

Editing of the acoustic signals includes removing the top 10% of frequencies, removing the bottom 10% of frequencies, removing the middle 10% of frequencies, repeating the acoustic signal at different repetition rates, and other parameters, as known in the art. This editing can be carried out in a variety of different ways, as known to one of ordinary skill in the art without undue experimentation. For example, the top 10% of frequencies can be removed sequentially until the lobsters are not affected, or the behavior changes. Alternatively, the bottom 10% of frequencies can be removed sequentially until the lobsters are not affected, or the behavior changes. Alternatively, the removal of top and bottom frequencies can be alternated until the lobsters are not affected, or the behavior changes, and so on.

The acoustic signals may be encoded by embedding the desired acoustic signal in a background of other acoustic signals that are not recognized by the desired marine animal. As long as the acoustic signal causes the desired effect in the desired animal, the device is considered to be functional.

This invention may be used to affect the behavior of any marine animal. The preferred marine animal is a crustacean, particularly a lobster. This invention may also be used to affect the behavior of fish and marine mammals. Acoustic signals of the animal of interest (or a predator animal) are recorded and played back underwater. The behavior of the animal is monitored. Acoustic signals that affect the behavior of the animal of interest in the desired way are selected. The selected acoustic signals can be used in a device, such as those described herein.

The signal may be incorporated into any device capable of playing the acoustic signal underwater. This device may be used in any suitable manner known to one of ordinary skill in the art, and is preferably attached to a trap or line. The device sends out acoustic signals 360 degrees from the signal source and can therefore attract marine animals both upstream and downstream from the signal source, as well as marine animals located above and below the signal source.

Sounds

The electronic device of the present invention may be used to affect the behavior of a variety of animals in a variety of geographical areas. For example, in Australia, the Western rock lobster is predominantly caught. Other species, such as *Panulirus Argus*, are present in Belize, Nicaragua, Cuba, Brazil, Bahamas, Mexico, Honduras, Venezuela, the United States and other locations.

The duration and repetition rate of the sound transmitted may be altered, as desired, as long as the transmitted sound performs the desired function. One currently preferred repetition rate is playing the sound every 0.944 seconds, but a repetition rate between 0.1 to 2 seconds may also be used, as well as other rates. Individual or multiple sounds can be played with a variety of durations to initiate a response from a species. The sound can be adjusted in a variety of ways. For example, the duration of some or all frequencies can be changed for adjustment for species, water depth, water temperature, salinity or other variables, as known in the art.

The sounds that can be played back using the electronic device are varied. For example, a "cover sound" can be added to mislead a predator from the target animal (e.g. lobster). The target animal sound can be used in an electronic device to attract its predator, such predators known in the art. The electronic device can play back more than one sound or combination of sounds using a selector or switch. The selector or switch can be accessible to the user or can be inside the case for activation by a third party.

The electronic device can be used to attract or repel animals from pollution, swimmers, water intake areas, agricultural areas or other areas, as known in the art. Electronic devices can be used to attract animals to conditions or areas such as underpopulated areas, the presence of nutrients or medicine, or other conditions or areas, as known in the art.

The electronic device may be remotely or automatically activated. Remote activation may be performed using a variety of mechanisms, known in the art. The electronic device may be activated when the device reaches a particular depth using a pressure gauge or other device as known in the art. The electronic device may also be activated in response to temperature using a temperature sensor, as known in the art. The electronic device may also be activated when the device is exposed to a variety of other conditions such as salinity of the water, using a sensor as known in the art.

The volume of the sound can be altered, using an external or internal volume control, or by control of the thickness of materials of the case, as known in the art and described herein.

The device may be tested using any suitable apparatus, such as a bell jar. The sound from the device can be analyzed outside of the bell jar and adjustments made to the sound or the case, if desired. The device may also be tested in an underwater environment, such as a tank.

Placement of Devices

The electronic devices are designed to broadcast sound for various distances, depending on the speaker design and material design, as described further herein and known in the art. This feature allows the use of fewer traps than currently used. Current fishing of lobsters is performed using single traps or multiple traps placed on trawls. Currently, when using trawls, the traps are spaced every 125-150 feet. Using the electronic device of the current invention, the spacing of the traps can be modified using differing broadcast radii. A larger broadcast radius will allow fewer traps to be used.

Figure 39:
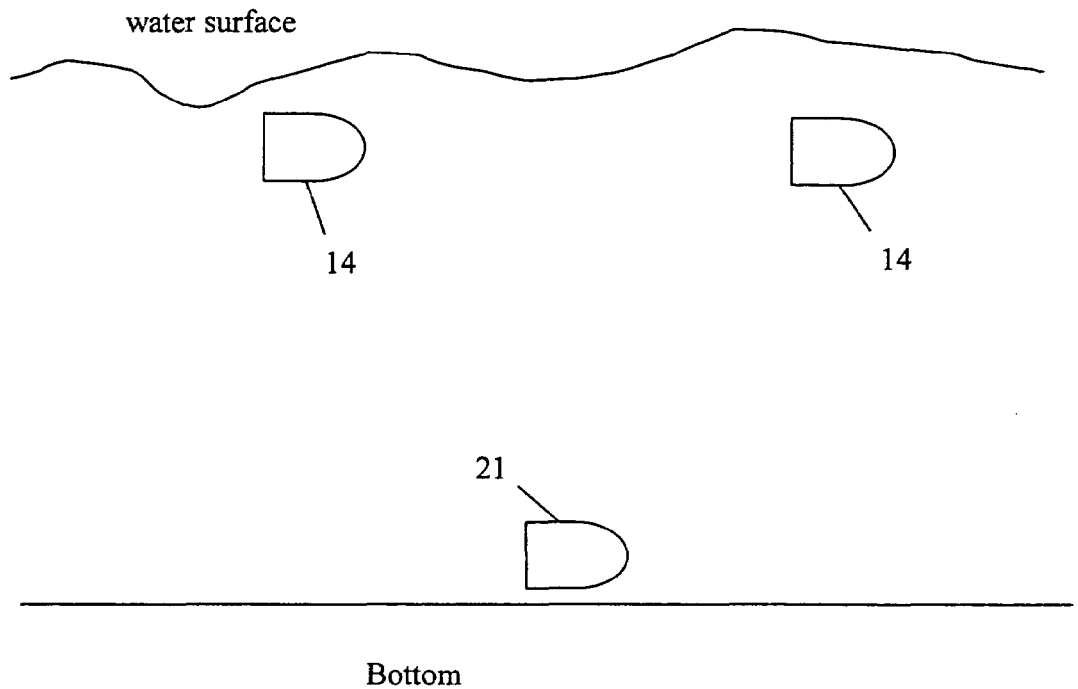
FIG. 39 shows one placement strategy for electronic devices.
Figure 40:
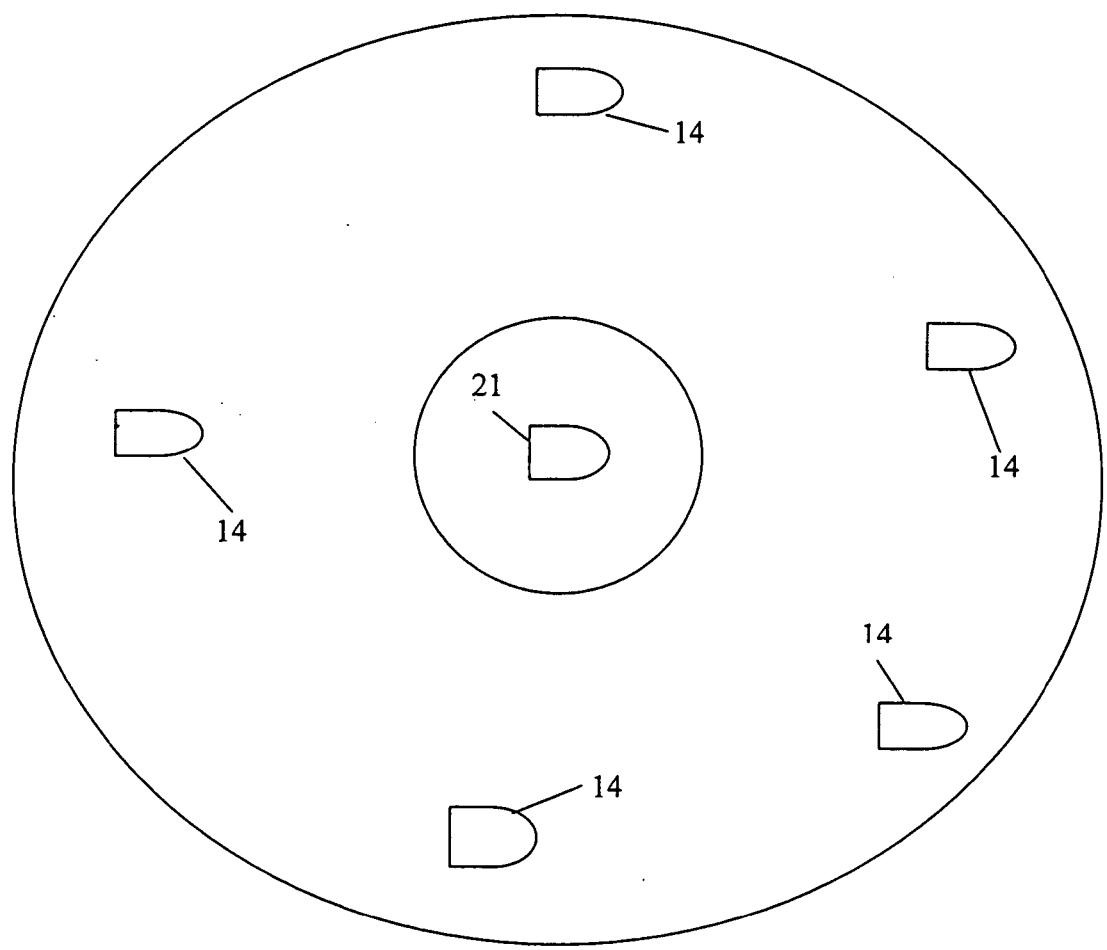
FIG. 40 shows one placement strategy for electronic devices.
Figure 41:
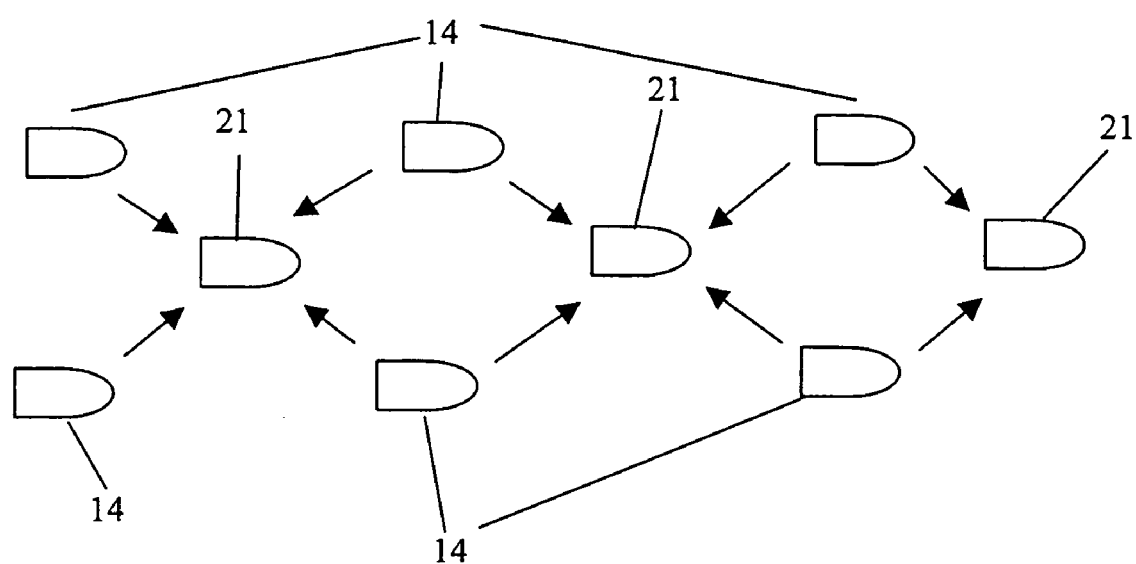
FIG. 41 shows one placement strategy for electronic devices.
Figure 42:
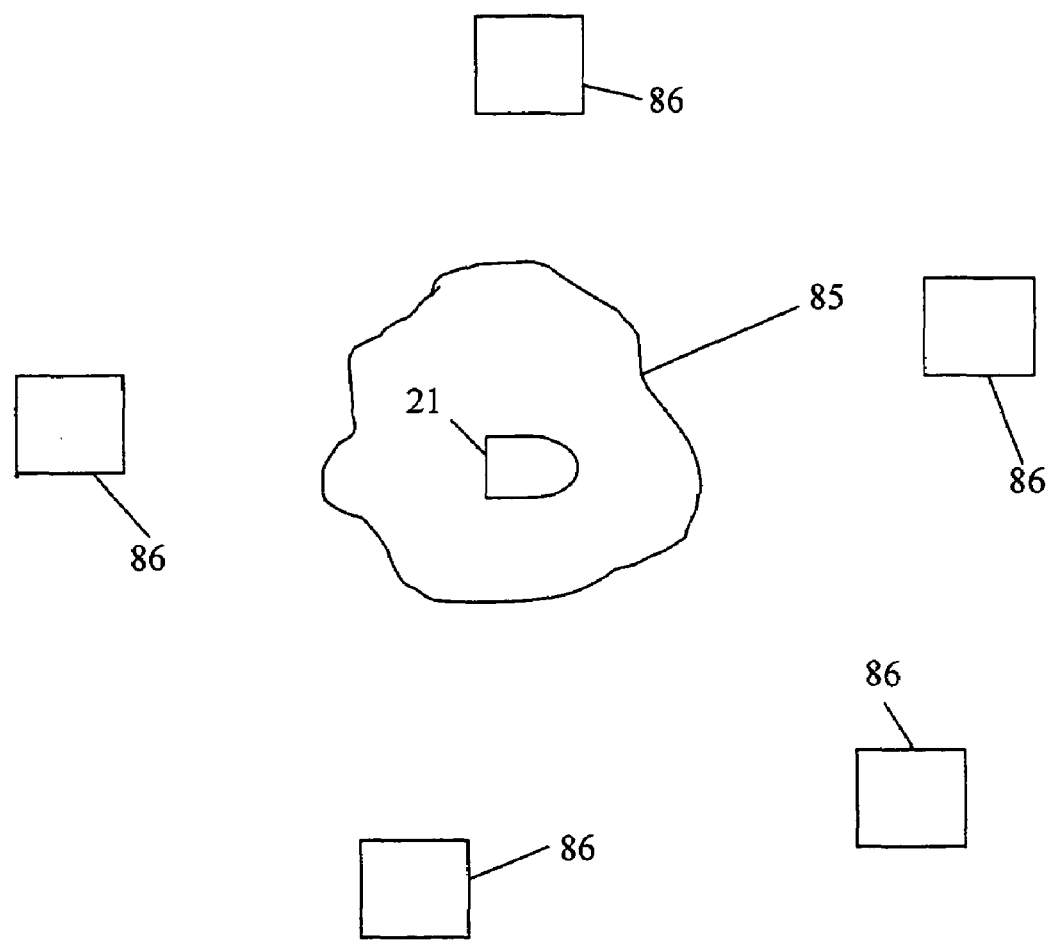
FIG. 42 shows one placement strategy for electronic devices.
Figure 43:
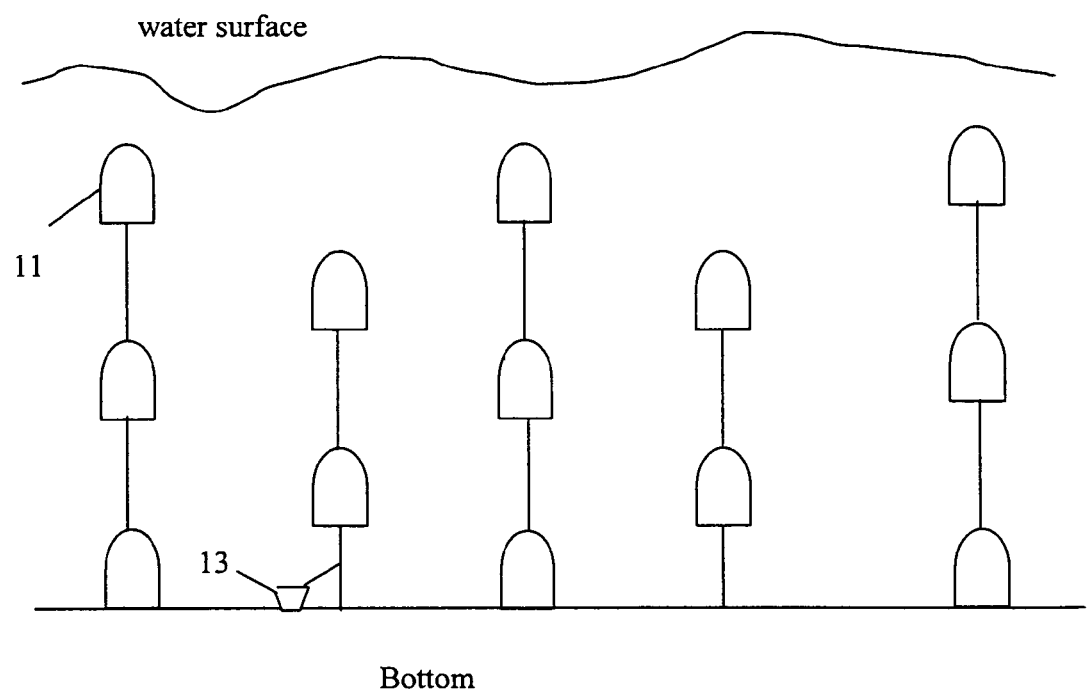
FIG. 43 shows one placement strategy for electronic devices.
Figure 44:
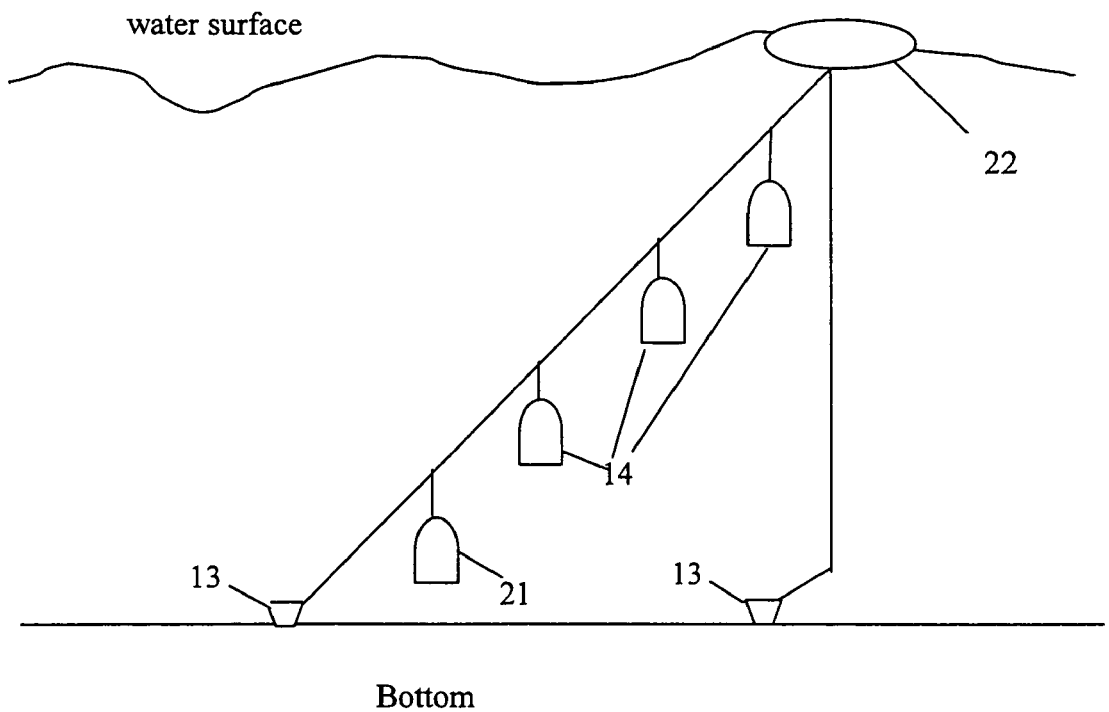
FIG. 44 shows one placement strategy for electronic devices.

The placement of the electronic devices in the water can be varied to perform a variety of functions. For example, as shown in FIG. 39, electronic devices that play a "repel" sound (14) can be positioned along with electronic devices that play an "attract" sound (21). This permits the electronic devices to be used to attract animals from a particular area or depth of water. Another strategy shown in FIG. 40 has one trap containing one or more devices with an "attract" sound (21) and electronic devices with "repel" sounds (14) arranged in a circular pattern around the trap with an "attract" sound. This will move the animals toward the trap. The electronic devices can float on the surface, be tethered or weighted to be positioned in the water column, or be tethered or weighted to be at or near the bottom. The "repel" electronic devices are positioned so that the normal sound distance of the "repel" sound is at or near the periphery of the "attract" sound, as shown in FIG. 40. Other strategies can be used, for example the strategy shown in FIG. 41. In FIG. 41, traps with electronic devices playing "attract" sounds (21) are arranged in a desired pattern. Electronic devices playing "repel" sounds (14) are also arranged in a desired pattern, such as offset from the traps, either in depth or distance or both. In this strategy, animals are driven to the traps, as shown by the arrows. Another strategy is shown in FIG. 42. In FIG. 42, one or more electronic devices playing an "attract" sound (21) is placed on or around a structure, as shown by the arrows (85) to which animals are desired to be attracted. Although not shown, one or more electronic devices playing a "repel" sound may be placed on or around a structure such as a reef from which animals are desired to be repelled. One or more traps (86) may be optionally placed around the structure. Another strategy is shown in FIG. 43. In FIG. 43, a "curtain" or "wall" of sound is used to contain animals or urge them to avoid a particular area. The strategy in FIG. 43 can also be used to attract animals. In FIG. 43, electronic devices (11) playing "repel" sounds are spaced on a vertical line. Multiple vertical lines are spaced apart from each other on a horizontal plane. The spacing of vertical lines and horizontal planes is preferably so that the sound radius of each electronic device overlaps, both horizontally and vertically. The vertical lines may be anchored or weighted (13). Another strategy is shown in FIG. 44. In FIG. 44, lines form a wall to drive animals near the bottom to a trap, food, a net, or other desired item. In FIG. 44, electronic devices playing "repel" sounds (14) are placed on a line that is anchored or weighted (30), as known in the art. An electronic device playing "attract" sounds (21) is placed at a desired point. A trap may be positioned at a desired point. A float (22) may be used, as known in the art.

Other strategies are possible. In one strategy, an electronic device (or devices) playing an "attract" sound is used to lure animals (for example a school of animals) from a high density area to a low density area or other desired area. The electronic device can be moved from day to day or other desired times to lure the animals to the desired area. A robot, vehicle (boat, for example) or winch may be used to move the electronic devices. A variety of electronic devices playing "attract" and "repel" sounds in any desired position may be used, as known in the art. In another strategy, a robot or other movable electronic device leads animals into a trap. Another strategy is to place electronic devices playing "repel" sounds on a loop that can be tightened. At the opening of the loop, a trap optionally containing an electronic device with an "attract" sound is placed. Electronic devices can be tethered in the water column or held on the bottom or at any desired depth using any mechanism known in the art, such as weights or anchors.

Power Sources

A variety of power sources can be used in the electronic devices. One power source is standard batteries of sufficient size and number to power the device for a desired amount of time and provide a desired amount of power. One such power source is AA batteries. Any suitable number of batteries can be used, such as groups of three, six, nine or twelve. In one configuration, six AA batteries allows operation of the electronic device for one month of continual use. In one configuration, twelve AA batteries allows operation of the electronic device for two months. In another configuration, D size batteries may be used, in sufficient number to provide a desired amount of power for a desired amount of time. It is known in the art that different configurations for the device and the use of different components have different power requirements and the number of batteries and battery size can be adjusted to provide the desired power.

Rechargeable batteries are another power source. Different types of rechargeable batteries, as known in the art, such as nickel-cadmium or nickel-metal hydride batteries may be used. The number of batteries required is easily determined by the power requirements of the device and desired operational duration.

Decreasing the number of times the electronic device has to be recharged decreases the cost of recharging and also decreases the possibility of contamination to the device coming from opening the recharging plug.

Charging Systems/Racks

Another aspect of the invention is a charging system and charging racks for the electronic devices. Racks may be designed to hold multiple electronic devices. Racks may be attached in parallel, and devices may be attached to racks in serial or parallel. A standard voltage may be supplied to the racks (such as 110-120 V, or international voltages, as known in the art).

Figure 45:
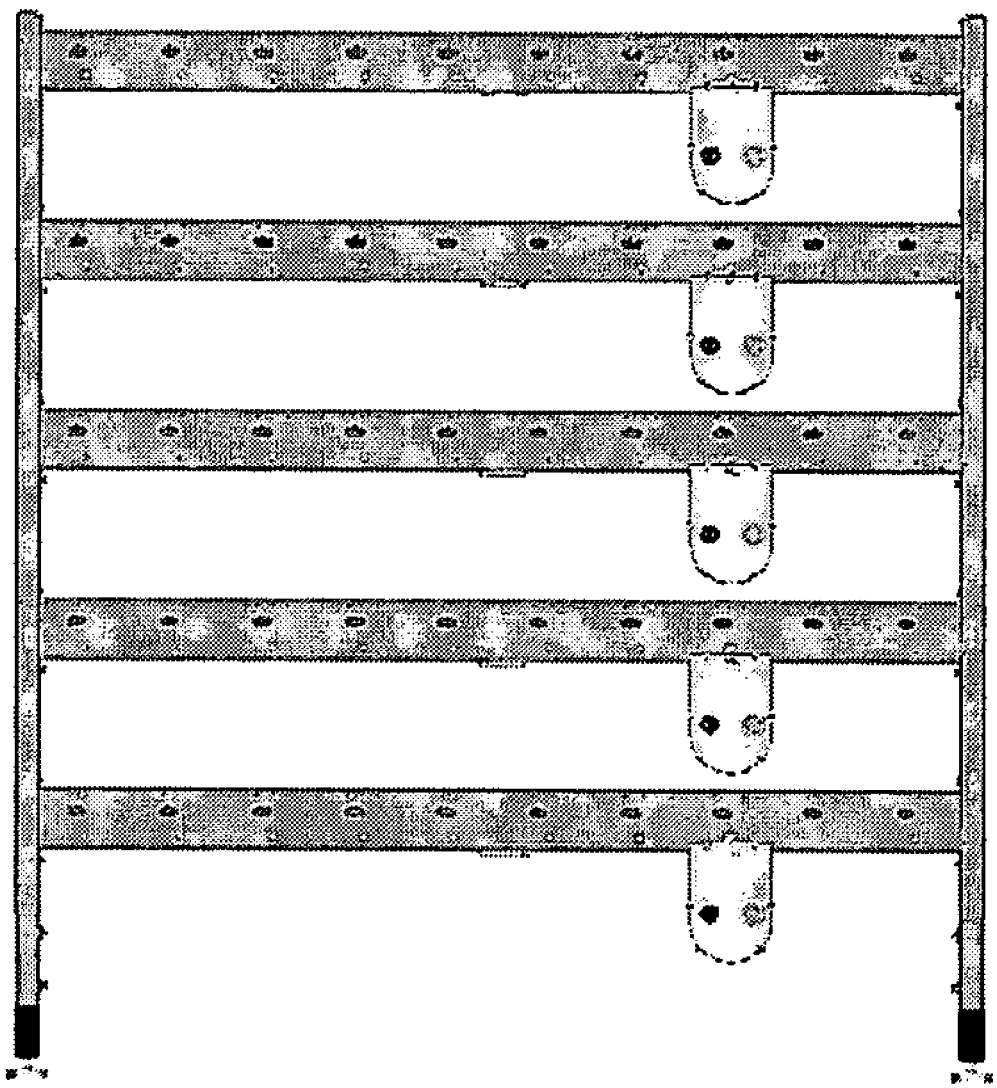
FIG. 45 shows one embodiment of the recharging rack.
Figure 46A:
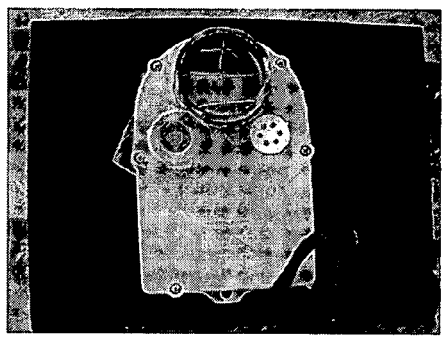
FIG. 46 shows four different embodiments of the electronic device.
Figure 46B:
Figure 46C:
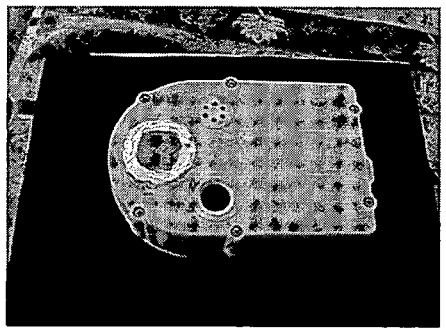
Figure 46D:
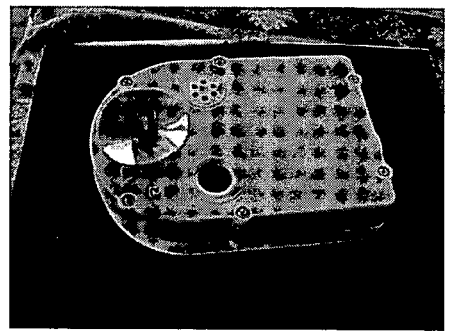

One embodiment of the charging rack is shown in FIG. 45. In this example, the rack is constructed from aluminum tubing, but any other suitable material may be used. The electronic devices are placed on shelves in the rack. The charging rack can be constructed so that devices can be placed on one side of the rack, as shown in FIG. 45, or the charging rack can be constructed so that devices can be placed on the front and back of the charging rack. The number of shelves of the charging rack and the length of the rack (number of electronic devices per shelf) is not limited to the number shown in FIG. 45. The charging port of the electronic devices may be plugged in directly to the rack, or attached via a wire to the rack. Another approach to recharging the batteries is to use an induction charging system which would provide the benefit of not having to open up the charging port. The rack is attached to a suitable power source.

In one embodiment, each system can charge batteries in devices singularly or in parallel. Electronic devices can be attached in parallel to a primary power source with the capacity to charge multiple batteries. The number of batteries that can be charged is limited by the power source, as known in the art. The electronic device may incorporate a sensor which monitors the battery temperature, to optimize the charging rate and reduce the risk of overheating of the battery, as known in the art. One option for the system is a constant trickle charge that maintains the battery at full capacity until the electronic device is removed from the charging system. An LED display or other display may be used to provide information on the status of the charging process. A discharging function can be added to the charging system or electronic device to optimize the recharging function.

The system may use any suitable input power, but universal input power of 85-264 V AC, 50/60 Hz is preferred. A switching regulator charger may be used. A linear charger may be used if there is sufficient power per electronic device. Different input cords can be used for use in different countries. Another optional feature is a minimum charge time indicator. Moisture and salt contamination can be measured using any method known in the art, in order to monitor and prevent damage to the electronic device. A coating may be applied on the circuits to reduce contamination, as known in the art.

In a preferred embodiment, the recharging plug faces upward for easier connecting to the recharging socket and helps avoid dirt and water contamination.

Applications

In addition to the other applications described herein, the electronic devices may be used to attract or repel lobsters or other marine animals for purposes other than collecting the animals for food. One application includes use by tour guides, where the electronic devices are activated to attract desired animals for sightseeing tourists, for example. Other applications include use by divers or aquariums. These and other uses are appreciated by those of ordinary skill in the art.

Distribution

In addition to the other aspects of the invention described, the method of distributing electronic devices described herein is included. One method is leasing electronic devices on a month-to-month, or other lease term basis, where the electronic device battery life corresponds to the lease term. This requires returning the electronic device to the manufacturer or a recharging location for continued operation. Returning the electronic device for recharging rather than having the consumer recharge the electronic device by opening the case helps protect the electronic device from contamination by dirt or water, for example. Another option is selling the device outright and tailoring the battery life to allow the electronic device to operate for the desired amount of time. Another option is allowing the user to recharge the device by replacing the batteries or using an external charger.

Although the description herein contains many specificities, these should not be construed as limiting the scope of the invention, but as merely providing illustrations of some of the presently preferred embodiments of the invention. For example, other configurations and materials for the device may be used, as known by one of ordinary skill in the art. In addition, acoustic signals from other marine animals not specifically described herein may be recorded and played back to affect the behavior of other marine animals, using the description provided herein. Other embodiments and uses for the invention will be readily recognized by one of ordinary skill in the art and are intended to be included in this disclosure. All references and materials herein are hereby incorporated by reference to the extent not inconsistent with the disclosure herewith.

We claim:

1. A method of affecting the behavior of lobsters, comprising playing a recorded acoustic signal of a lobster underwater, which acoustic signal affects the behavior of lobsters and which acoustic signal has been edited to isolate a sound train.

2. The method of claim 1, wherein the recorded acoustic signal attracts lobsters.

3. A method of affecting the behavior of lobsters, comprising recording an acoustic signal of a lobster; editing the acoustic signal of the lobster to isolate a sound train, whereby a recorded acoustic signal of a lobster is prepared; and playing the recorded acoustic signal of a lobster underwater, which acoustic signal affects the behavior of lobsters.

4. The method of claim 1, wherein the recorded acoustic signal repels the lobster away from the recorded acoustic signal.

5. A method of attracting lobsters, comprising playing a recorded attractive acoustic signal of a lobster underwater, wherein the acoustic signal of the lobster has been edited to isolate a sound train.

6. A method of attracting lobsters, comprising playing a recorded attractive acoustic signal of a lobster underwater, wherein the recorded attractive acoustic signal is the signal shown in FIG. 1.

7. A method of preparing acoustic signals that affect lobster behavior, comprising:
   recording acoustic signals from lobsters;
   editing the acoustic signals to remove non-naturally occurring sounds;
   isolating one or more acoustic signals;
   playing one or more acoustic signals underwater;
   observing the behavior of lobsters;
   selecting those acoustic signals that correlate with an observable behavioral change in lobsters.

8. A device for influencing marine animal behavior comprising:
   a water-resistant housing;
   a memory disposed within the housing, which memory stores at least one recorded acoustic signal from an animal, which acoustic signal has been edited from the naturally occurring signal;
   playback device electrically connected to the memory and capable of playing the acoustic signal;

a power source electrically connected to the memory and playback device.

9. The device of claim 8, wherein the playback device is an acoustical transducer disposed within said housing responsive to electrical signals to play acoustical output signals corresponding to the acoustic signal.

10. The device of claim 8, wherein the marine animal is a lobster.

11. A method of catching lobsters comprising:
attaching a device of claim 8 to a trap.

12. A method of affecting the behavior of a crustacean, comprising playing a recorded acoustic signal of a crustacean underwater, which acoustic signal affects the behavior of a crustacean, and which acoustic signal has been edited to isolate a sound train.

13. A method of attracting a crustacean, comprising playing a recorded attractive acoustic signal of a crustacean underwater, wherein the acoustic signal of the crustacean has been edited to isolate a sound train.

14. A method of preparing acoustic signals that affect crustacean behavior, comprising:

recording acoustic signals from crustacea;
editing the acoustic signals to remove non-naturally occurring sounds;
isolating one or more acoustic signals;
playing one or more acoustic signals underwater;
observing the behavior of crustacea;
selecting those acoustic signals that correlate with an observable behavioral change in crustacea.

15. A method of preparing acoustic signals that affect the behavior of marine animals using an electronic device, comprising:

recording acoustic signals from marine animals;
editing the acoustic signals to remove non-naturally occurring sounds;
isolating one or more acoustic signals;
playing one or more acoustic signals underwater;
observing the behavior of marine animals;
selecting those acoustic signals that correlate with an observable behavioral change.

* * * * *